United States Patent
Watanabe et al.

(10) Patent No.: US 9,201,695 B2
(45) Date of Patent: Dec. 1, 2015

(54) COMPUTER SYSTEM AND CONTROL METHOD FOR ACQUIRING REQUIRED RESOURCES

(75) Inventors: Kentaro Watanabe, Yokohama (JP);
Yoshifumi Takamoto, Kokubunji (JP);
Takashi Tameshige, Tokyo (JP)

(73) Assignee: Hitachi, Ltd., Tokyo (JP)

(*) Notice: Subject to any disclaimer, the term of this patent is extended or adjusted under 35 U.S.C. 154(b) by 245 days.

(21) Appl. No.: 13/820,638

(22) PCT Filed: Jan. 28, 2011

(86) PCT No.: PCT/JP2011/000499
§ 371 (c)(1),
(2), (4) Date: Mar. 4, 2013

(87) PCT Pub. No.: WO2012/032679
PCT Pub. Date: Mar. 15, 2012

(65) Prior Publication Data
US 2013/0160014 A1 Jun. 20, 2013

(30) Foreign Application Priority Data
Sep. 6, 2010 (JP) ................ P2010-198766

(51) Int. Cl.
G06F 9/50 (2006.01)
G06F 9/455 (2006.01)

(52) U.S. Cl.
CPC ...... *G06F 9/50* (2013.01); *G06F 9/455* (2013.01); *G06F 9/45533* (2013.01); *G06F 9/5011* (2013.01); *G06F 2209/5011* (2013.01)

(58) Field of Classification Search
None
See application file for complete search history.

(56) References Cited

U.S. PATENT DOCUMENTS

| | | | |
|---|---|---|---|
| 6,941,437 B2* | 9/2005 | Cook et al. | 711/173 |
| 8,065,676 B1* | 11/2011 | Sahai et al. | 718/1 |
| 8,234,650 B1* | 7/2012 | Eppstein et al. | 718/104 |
| 2003/0110173 A1* | 6/2003 | Marsland | 707/10 |
| 2004/0128670 A1* | 7/2004 | Robinson et al. | 718/1 |
| 2004/0181794 A1 | 9/2004 | Coleman et al. | |
| 2005/0149940 A1* | 7/2005 | Calinescu et al. | 718/104 |
| 2005/0235288 A1 | 10/2005 | Yamakabe et al. | |
| 2005/0262505 A1* | 11/2005 | Esfahany et al. | 718/1 |
| 2007/0271560 A1 | 11/2007 | Wahlert et al. | |

(Continued)

FOREIGN PATENT DOCUMENTS

| JP | 2006-520027 | 8/2006 |
|---|---|---|
| JP | 2009-159087 | 7/2009 |

(Continued)

OTHER PUBLICATIONS

Hiroki Otsuka, "Kaso Kankyo no Fuka Bunsan to Un'yo ni Kiku Live Migration," Nikkei Systems, May 26, 2008, No. 182, pp. 104-109.
International Search Report in PCT/JP2011/000499, dated Feb. 22, 2011.

*Primary Examiner* — Emerson Puente
*Assistant Examiner* — Zhi Chen
(74) *Attorney, Agent, or Firm* — Mattingly & Malur, PC

(57) ABSTRACT

In cases where decided that the guaranteed resource capacity for virtual machine cannot be acquired all at one time, the computer system of the present invention decides whether or not resource capacity guaranteed for virtual machine can be continuously acquired by the start of the virtual machine operation, and if decided that the resource capacity can be continuously acquired, the computer system allocates the total acquired resource capacity to the virtual machine deployed on the physical machine.

15 Claims, 24 Drawing Sheets

(56) References Cited

U.S. PATENT DOCUMENTS

2008/0163210 A1* 7/2008 Bowman et al. .................. 718/1
2012/0033623 A1* 2/2012 Chu et al. ...................... 370/329

FOREIGN PATENT DOCUMENTS

JP         2009-537894        10/2009
JP         2009-265778  A1    11/2009

* cited by examiner

FIG. 3

| VIRTUAL SERVER 201 | PHYSICAL SERVER 202 | ACTUAL ALLOCATION RESOURCE CAPACITY 203 | REQUESTED RESOURCE CAPACITY 204 | ACQUIRED RESOURCE CAPACITY 205 | SCHEDULED ACQUISITION RESOURCE CAPACITY 208 | ACQUISITION FLAG 206 | COLLECTION TIME 207 |
|---|---|---|---|---|---|---|---|
| VIRTUAL SERVER 1 | MANAGED PHYSICAL SERVER 1 | 30GB | 40GB | 30GB | 30GB | false | 2010/4/30 12:00:00 |
| VIRTUAL SERVER 2 | MANAGED PHYSICAL SERVER 1 | 30GB | 40GB | 30GB | 30GB | false | 2010/4/30 12:00:00 |
| VIRTUAL SERVER 3 | MANAGED PHYSICAL SERVER 1 | 20GB | 20GB | 30GB | 30GB | false | 2010/4/30 12:00:00 |
| POOL 1 | MANAGED PHYSICAL SERVER 1 | 30GB | 30GB | 30GB | 20GB | true | 2010/4/30 12:00:00 |
| VIRTUAL SERVER 4 | MANAGED PHYSICAL SERVER 2 | 20GB | 20GB | 30GB | 30GB | false | 2010/4/30 12:00:00 |
| VIRTUAL SERVER 5 | MANAGED PHYSICAL SERVER 2 | 10GB | 10GB | 30GB | 30GB | false | 2010/4/30 12:00:00 |
| POOL 2 | MANAGED PHYSICAL SERVER 2 | 0GB | 0GB | 0GB | 10GB | true | 2010/4/30 12:00:00 |
| POOL 3 | MANAGED PHYSICAL SERVER 3 | 120GB | 120GB | 120GB | 150GB | true | 2010/4/30 12:00:00 |

| WORK-TASK | WORK-TASK PRIORITY LEVEL | REQUESTED RESOURCE CAPACITY | SCHEDULED PERIOD | VIRTUAL SERVER | SYSTEM REQUIREMENTS |
|---|---|---|---|---|---|
| TICKET SALES SYSTEM 1 | 4000 | 90GB | 2010/1/1/-2010/12/31 | VM1, VM2, VM3 | PLACE VIRTUAL SERVER 1 AND VIRTUAL SERVER 2 IN DIFFERENT PHYSICAL SERVERS |
| TICKET SALES SYSTEM 2 | 4000 | | 2010/4/1/-2011/3/31 | VM4, VM5, VM6 | PLACE VIRTUAL SERVER 4 AND VIRTUAL SERVER 5 IN PHYSICAL SERVER |
| DEVELOPMENT ENVIRONMENT LEASE 1 | 1000 | | 2009/12/1/-2010/8/31 | VM7, VM8, VM9 VM10 | n/a |
| DEVELOPMENT ENVIRONMENT LEASE 2 | 1000 | | 2010/4/24/-2010/5/5 | VM11 | n/a |
| SALARY MANAGEMENT SYSTEM 1 | 2000 | | 2010/8/14/-2010/8/22 | VM12 | n/a |
| INVENTORY MANAGEMENT SYSTEM 1 | 2000 | | 2010/8/14/-2010/8/22 | VM13 | n/a |
| ATTENDANCE MANAGEMENT SYSTEM 1 | 2000 | | 2010/8/14/-2010/8/22 | VM14 | n/a |

| PHYSICAL SERVER ~401 | TOTAL RESOURCE CAPACITY ~402 | AVAILABLE RESOURCE CAPACITY ~403 | NON-ACQUIRED RESOURCE CAPACITY ~404 |
|---|---|---|---|
| MANAGED PHYSICAL SERVER 1 | 120GB | 0GB | 0GB |
| MANAGED PHYSICAL SERVER 2 | 120GB | 60GB | 60GB |
| MANAGED PHYSICAL SERVER 3 | 120GB | 120GB | 0GB |
| MANAGED PHYSICAL SERVER 4 | 120GB | 0GB | 30GB |

COMPUTER SYSTEM AND CONTROL METHOD FOR ACQUIRING REQUIRED RESOURCES

TECHNICAL FIELD

The present invention relates to a computer system, and a control method for a computer system, and relates in particular to a computer system for controlling the allocation of resources to virtual machines and a method for allocating resources to virtual machines.

Along with advances in the information society, there is also a trend to install multiple servers in clusters in company information processing systems and data centers, etc. Moreover, there is also a trend to increase the number of servers. Furthermore, increasing the number of servers also increases the labor required for server operation management and consequently leads to a rise in management costs that is too large to ignore.

Whereupon attention was focused on technology for virtualizing computers in order to boost server operating efficiency. The architecture or software for achieving a virtualized computer operates multiple virtual machines by the virtualizing of physical resources such as computer processors and storage devices. More specifically, the architecture or software logically sub-divides the physical resources, and assigns the sub-divided physical resources to each of the virtual machines. The virtualizing software for creating the virtual environment on a computer is known as a hypervisor such as Virtage, VMware, and Hyper-V (all trade names).

Each of the multiple virtual machines can run an OS or application program by utilizing the sub-divided resources. Virtual machines therefore provide the benefit that the physical server is operated more efficiently and consequently the number of (physical) computers can be decreased.

A business operation utilizing virtual technology on physical servers is the server hosting service. The server hosting service is a business operation that lends a portion of the physical server to the user for a certain period. The operator of the server hosting service installs multiple servers in a cluster in a data center, obtains a resource capacity matching requests from multiple users for resource allocation, and assigns that resource capacity to the virtual server utilized by the user.

The user then utilizes the virtual machines assigned with resources as a work-task system. The resource administrator manages the scheduling of the resource capacity that will be utilized on the multiple servers in order to avoid conflicts from the multiple virtual machines seizing resources from one physical computer.

The resource administrator deploys virtual machines on the physical server capable of assigning a resource capacity requested by the user prior to the time and date that the user commences usage of the work-task system.

The resource administrator utilizes a management system capable of uniform management of the multiple virtual environments. This management system is capable of specifying the physical server functioning as the destination for deploying the virtual machines according to the available resource status.

When the resource capacity assigned to the user is inadequate, the resource administrator attempts to adjust the resource capacity among the multiple virtual servers based on the order of priority of the contract and work-task system with the user. However, when the resource administrator determines that the resource capacity required by the user cannot acquire, then that information must be swiftly reported to the user.

Technology of the related art for acquiring resources for the virtual server is for example the resource control system disclosed in the Japanese Unexamined Patent Application Publication No. 2005-309644.

This resource control system of the related art is featured in operating the work-task system, periodically collecting the resource usage status of the virtual server that dynamically fluctuates according to the assigned resource capacity, calculating the resource capacity required by the virtual server usage status, and retrieving the surplus resource capacity from the resource assigned to the virtual server.

SUMMARY

The resource control system of the related art measured the available resource status on the physical computer and attempted to acquire resources for a virtual machine. However, when other virtual machines were temporarily using the resources, the resource control system was forced to decide that resources cannot be acquired at that time for the target virtual machine. This trend markedly increased when the resource control system of the related art attempted to provide a large resource capacity for the virtual machine all at one time. A surplus resource capacity can however be made available for the virtual machine if the time is equalized and in many cases adequate resources can be acquired for the target virtual machine.

In view of the aforementioned problems with the related art, the present invention has the object of providing a computer system and a control method for that computer system capable of efficiently allocating physical computer resources to physical machines.

A further object of the present invention is to provide a computer system and a control method for that computer system capable of allocating physical computer resources to virtual machines by recognizing that a substantial surplus resource capacity is available even if there is a temporary shortage in resource capacity.

In order to achieve the above stated objectives, when judged that sufficient resource capacity to ensure virtual machine operation cannot be acquired all at one time, the computer system of the present invention decides whether resource capacity required for virtual machine operation can be continuously acquired prior to startup of the virtual machines; and if decided that the resource capacity can be continuously acquired, the computer system allocates the total acquired resource capacity to the virtual machine deployed on the physical computer.

The present invention can therefore provide a computer system and a control method for that computer system capable of efficiently allocating resources of the physical computer to the virtual machine; and can moreover provide a computer system and a control method for that computer system capable of allocating resources to a virtual machine by recognizing that a substantial surplus resource capacity is available even if there is a temporary shortage in resource capacity.

BRIEF DESCRIPTION OF THE DRAWINGS

FIG. 3 is one example of a virtual machine resource table;

FIG. 4 is one example of a work-task table;

FIG. 5 is one example of a physical computer resource table;

DETAILED DESCRIPTION

Figure 1:
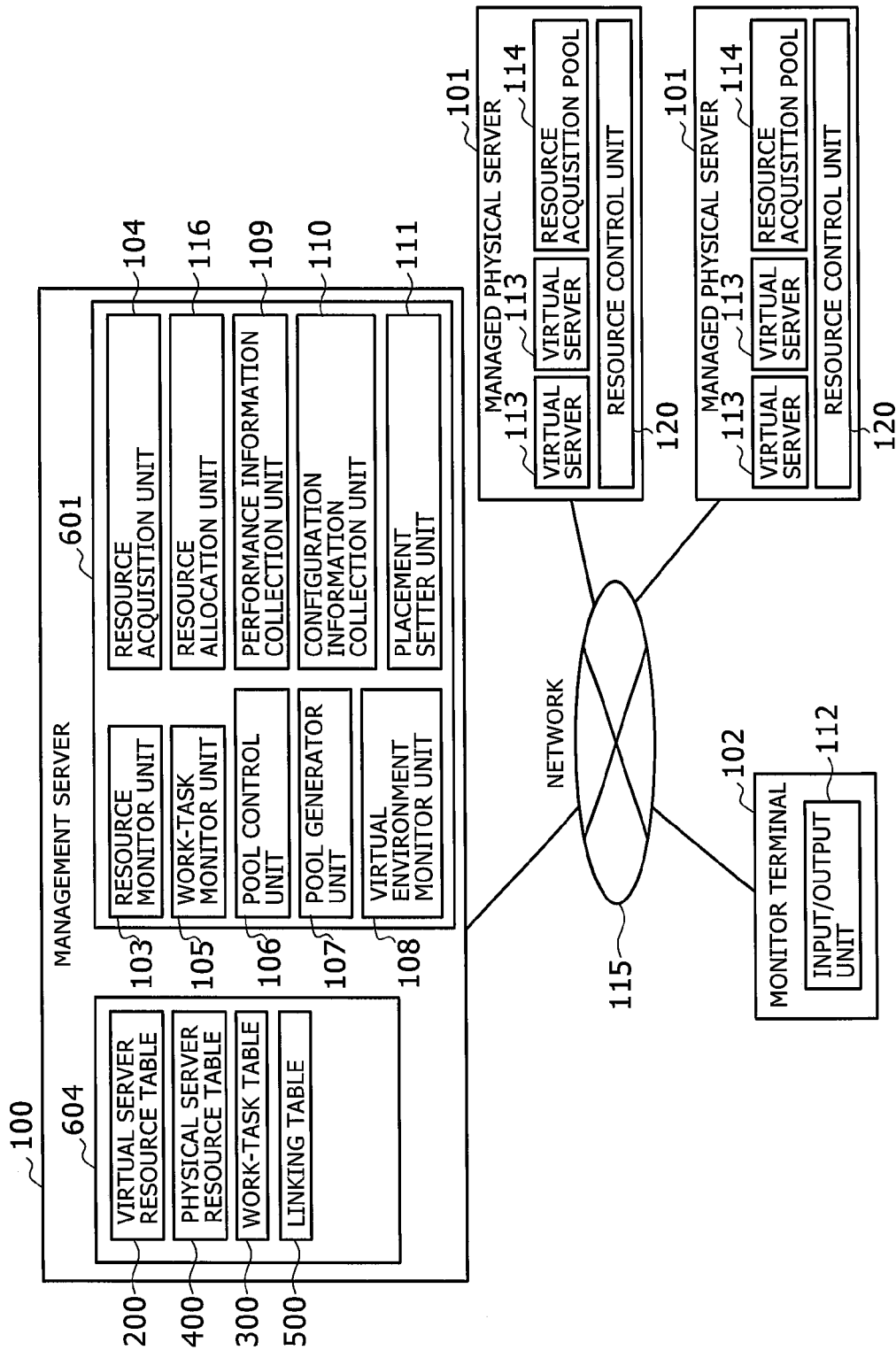
FIG. 1 is a block diagram of the hardware of the computer system of the first embodiment of the present invention.

The embodiments of the present invention are described while referring to the accompanying drawings. FIG. 1 is a block diagram of the hardware of the computer system of the first embodiment of the present invention. This computer system is comprised of multiple physical servers 101, a management server 100 mainly for executing resource management of the physical servers, a monitor terminal 102, and a network 115 mutually coupling the aforementioned components.

Virtualizing software is loaded in the physical server 101. The virtualizing software is for the purpose of creating multiple computers virtually capable of operating on the OS of the physical computer. Computers created virtually in this way are called virtual computers or virtual machines. The virtualizing software sub-divides the resources of the physical computer into multiple regions and utilizes these region segments to achieve an environment where multiple virtual machines can operate.

The virtual machines may include servers and may include clients. The former are referred to as virtual servers, and hereafter the present invention is described based on a configuration where multiple virtual servers are set in the physical server. However, if a virtual machine then operation is not limited to that of a virtual server and so the virtual machine may also utilized for the client, serving either application.

The virtual server utilizing resources that were assigned to it runs on an OS or application almost as if an actual physical server. The resources may include a processor, memory, storage (hard disk or SSD and so on) and a network, etc.

Multiple virtual machine environments (systems) having different usage purposes, and OS such as Web servers and mail servers, can be configured on one physical server. The management server 100 manages allocation of the resources of the physical server 101 serving as the management target to the virtual server.

Figure 2:
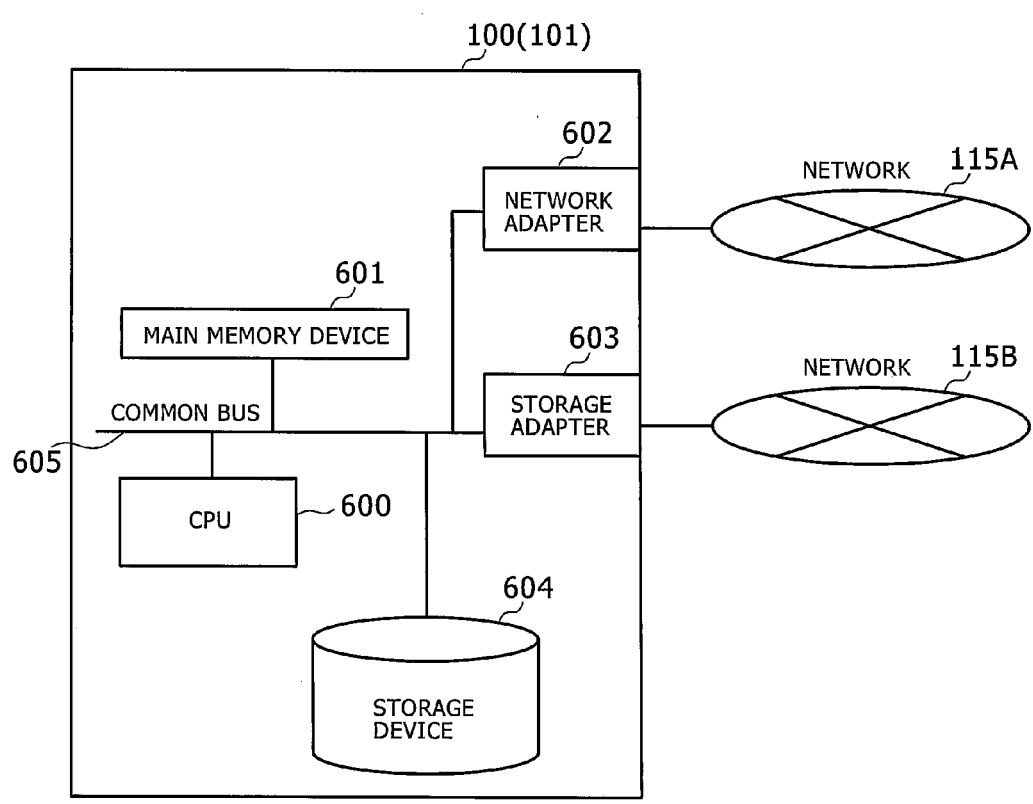
FIG. 2 is a block diagram showing the common hardware structure of a management computer/server and a physical machine.

FIG. 2 is a block diagram showing the common hardware structure of the management server 100 and the physical server 101. The management server 100 and the managed physical server 101 include a hardware structure identical to that of a general-purpose computer.

The server includes a CPU 600, a main memory device 601, a network adapter 602, a storage adapter 603, a storage device 604, and a common bus 605 that mutually connects these components.

A network adapter 602 is connected to the management network 115A. The CPU 600 is connectable to other servers by way of the network 115A.

The storage adapter 603 is connected to a storage network 115B such as SAN. The CPU 600 may therefore connect to external storage devices by way of the storage network 115B.

A resource management program such as virtualizing software is stored in the storage device 604 of physical server 101. The virtualizing software executes processing to pool the resources in a resource pool, and allocate resource capacity from the resource pool to the virtual server. Namely, allocation of resources to the virtual server is performed from the resource pool when the virtual server is linked to the resource pool. The resource acquisition pool 114 described later on is a pool that utilizes the resource pool for the purpose of acquiring resources.

As shown in FIG. 1, virtualizing software run on the physical server 101 constructs a computer environment (system) configured from a resource acquisition pool 114 for acquiring resources allocated to the virtual server 113 from a physical server, and a resource control unit 120 to perform resource management processing such as allocating resources from the resource acquisition pool 114 to the virtual server 113, and allocating resources to the resource acquisition pool 114.

One example of a parameter for setting or defining the resource capacity allocated to the virtual server 113 or the resource pool is the "guaranteed value". This guaranteed value is a parameter equivalent to the guaranteed resource capacity for allocation to the virtual server 113 and resource pool. The resources allocated to that virtual server or resource pool are therefore guaranteed within a range of the guaranteed values, even if there is a conflict due to a virtual server or resource pool competing for resources with another virtual server. The guaranteed value is one among the resource allocation parameters contained in the virtualizing software, and is typically called a scheduled value or lower limit value.

The management server 100 executes management and control processing for acquiring the resource capacity needed by the virtual server, and also performs resource management processing such as deciding the physical server that will serve as the virtual server deployment destination.

The management server 100 sets a scheduled value serving as a guide for the resource capacity required by the virtual server. The management server 100 sets a physical server containing a resource acquisition pool 114 having a resource capacity equivalent to the scheduled value as the virtual server deployment destination.

When starting up the virtual server 113, the resource control unit 120 in the managed physical server executes control to acquire a resource capacity equivalent to the scheduled value from the resource acquisition pool 114 into the virtual server 113. Management of the resource capacity is executed based on sub-division of the resource such as the physical server's processor, memory, or I/O into logical blocks.

The management server 100 controls all of the resource acquisition pool 114 and virtual servers 113 in the managed physical server 101 to allow or prohibit acquiring the resource capacity needed for the virtual server 113. The physical server capable of acquiring the resource capacity needed by the virtual server is set as the deployment destination of the virtual server. A resource acquisition pool 114 is set into each of the multiple managed physical servers 101.

The CPU 600 in the management server 100 as shown in FIG. 1 executes various control and management functions on physical server resources such as a resource control unit 103, a resource acquisition unit 104, a work task monitor unit 105, a resource allocation unit 116, a pool control unit 106, a pool generator unit 107, a virtual environment monitor unit 108, a performance information collection unit 109, a configuration information collection unit 110, and a placement setter unit 111 by executing management programs stored in the storage device 604 implemented via the main memory device 601.

The management server 100 contains a management table holding management data required for executing the applicable control and management functions on the storage device 604. The management table contains virtual server resource table 200, a physical server resource table 400, a work-task table 300, and a linking table 500 for linking the virtual server with the resource acquisition table.

The resource monitor unit 103 executes upper level resource management processing and coordinated functions on other control units. The resource acquisition unit 104 executes processing to acquire resources allocated to the virtual server 113 in the resource acquisition pool 114. The work task monitor unit 105 executes processing to monitor the work-task systems operated by the virtual server 113.

The resource allocation unit 116 is a processing unit that utilizes the resource control unit 120 in the managed physical server 101 to control allocation to the virtual server 113 of resources managed by the management server 100.

The pool control unit 106 is a processing unit that utilizes the resource control unit 120 to control the resource capacity of the resource acquisition pool 114.

The pool generator unit 107 performs processing to generate a resource acquisition pool 114 in the managed physical server 101. The virtual environment monitor unit 108 provides an I/F to control the resource control unit 120 to the management server 100. The management server 100 controls multiple managed physical servers 101 by way of the network 115A.

The virtual environment monitor unit 108 accesses all of the processing in the resource acquisition unit 104, the resource allocation unit 116, the pool control unit 106, the pool generator unit 107, the performance information collection unit 109, and the configuration information collection unit 110 by way of the virtual environment monitor unit 108 to the managed physical server 101.

The performance information collection unit 109 is a processing unit that collects operating information and performance information on the managed physical server 101, the virtual server 113, and the resource acquisition pool 114. This performance information includes the CPU usage rate, memory usage rate, storage capacity, data transfer speed with storage, network data transfer speed, and resource allocation capacities from the physical server to the virtual server such as CPU allocation quantity and memory allocation quantity, etc.

The configuration information collection unit 110 is a processing unit for collecting configuration information on the managed physical server 101, the virtual server 113, and the resource acquisition pool 114. The configuration information is information relating to the hardware configuration of the managed physical server 101, the logical system configurations such as the Web3 hierarchical structures, and also the work-task system configurations of those system configurations.

The performance information collection unit 109 and the configuration information collection unit 110 each periodically access the processing object at specified sampling periods, collect information, and record the collected information in the management table.

The placement setter unit 111 sets which managed physical server 101 to place and operate the virtual server 113 for assignment of resources. The placement setter unit 111 is a processing unit for setting the physical server where the virtual server must be placed.

The virtual environment monitor unit 108 is present inside the management server 100; however, the management server 100 can be present in another physical server that can be accessed by way of the network 115. The resource acquisition unit 104 of the management server 100 can for example in that case also access the managed physical server 101 by way of the virtual environment management unit of the applicable physical server. The virtual environment monitor unit 108 may also operate on the virtual server 113.

Each processing unit of the management server may also access the managed physical server by way of an I/F (interface) for the resource control unit 120 without utilizing the virtual environment monitor unit 108.

The resource control unit 120 executes control and management processing of the virtual server 113 and resource acquisition pool 114 after receiving commands from the management server 100.

The monitor terminal 102 sends input information for managing the management server 100 by way of the network 115A, and also receives information on management status that was output from the management server 100. The reference numeral 112 denotes the input/output unit comprised of hardware such as a keyboard and display, and software such as an interface.

The management user refers by way of the monitor terminal 102 to configuration information and performance information for the managed physical server 101, the virtual server 113, and the resource acquisition pool 114 that are subject to control (control objects) by the management server 100. The management user then applies control and management processing to these control objects by way of the management server 100.

FIG. 3 is one example of the virtual server resource table 200. The virtual server resource table 200 manages the resources of the virtual server 113 and the resource acquisition pool (abbreviated to "pool" in FIG. 2) 114.

The virtual server resource table 200 contains a virtual server and resource acquisition pool recognition field 201, a physical server recognition field 202, an actual allocation resource capacity field 203, a requested resource capacity field 204, an acquired resource capacity field 205, an acquisition flag field 206, a collection time field 207, and a scheduled acquisition resource capacity field 208.

Information for recognizing the entities (virtual server 113 or resource acquisition pool 114, resource pools other than the resource acquisition pool) is recorded in the virtual server and resource acquisition pool recognition field 201. This recognition information is key information for each record in the virtual server resource table.

Information for recognizing the managed physical server 101 where the entity operates is recorded in the physical server recognition field 202.

The resource capacity currently allocated to the entity is recorded in the actual allocation resource capacity field 203.

The resource capacity acquired by the entity is recorded in the acquired resource capacity field 205. If the entity is the virtual server 113 then the acquired resource capacity is a quantity based on an amount equivalent to the previously described guaranteed value of the virtual server. If the entity is a resource acquisition pool then the acquisition resource capacity is an amount based on the resource capacity equivalent to the previously described guaranteed value of the resource acquisition pool.

If a virtual server belongs to the resource acquisition pool, then the guaranteed value of the resource acquisition pool is usually larger than the sum of the guaranteed values of virtual servers belonging to the resource acquisition pool. The management server 100 cannot usually set a value exceeding the available resource capacity of the physical server, as the guaranteed value in the resource acquisition pool 114. The management server 100 increases the guaranteed value of the resource acquisition pool within the range of the available resource capacity based on the current state of the physical server available resource capacity that can be measured and acquired.

The resource capacity that the entity requested to the resource allocation unit 116 for allocation is recorded in the requested resource capacity field 204. If the resource capacity of the managed physical server 101 is not at a critical level, then the requested resource capacity field 204 and the actual allocation resource capacity field 203 reach equivalent values.

On the other hand, if the resource capacity of the managed physical server 101 is at a critical level, the resource control unit 120 cannot allocate a resource capacity to the entity that meets the required resource capacity and so the actual allocated resource capacity might sometimes be smaller than the required resource quantity. If the requested resource capacity is smaller than the acquired resource capacity then the requested resource capacity and the actual allocation resource capacity usually reach equivalent values. Conversely, if the requested resource capacity is the same or larger than the acquired resource capacity then the actual allocation resource capacity field 203 usually does not drop below the acquired resource capacity.

Gigabytes (GB) expressing the memory size and storage capacity are recorded in the actual allocation resource capacity field 203, the requested resource capacity field 204, and the acquired resource capacity field 205 as shown in FIG. 3. However in the case that the resource assigned to the virtual server is a network or processor, then the CPU frequency (Hz), disk transfer capacity or network transfer capacity (MB/s, packet quantity/s) is recorded as the resource capacity. If there are plural types of resources, then a combination of the multiple types of resource capacities may be recorded or a value calculated from the multiple types of resource capacities may be recorded.

Flag information for allowing the management server 100 to decide whether or not there is an entity to acquire the resource in order to allocate resources from the physical server to the virtual server is recorded in the acquisition flag field 206.

To set a pool as the resource acquisition pool, the management server 100 records a "true" as the acquisition flag, and records a "false" when not setting a pool as the resource acquisition pool.

The virtual server is usually the supply destination for the source, so a "false" is usually recorded the acquisition flag since the virtual server is not the resource supply source. However, if setting the virtual server as the supply source for the resource then the virtual server is set to "true." The virtual server that is the resource supply source may for example creates a state that receives a simulated load unrelated to the work task by a special program in, and then assigns a resource acquired based on this simulated load to a virtual server for executing work task. The record collection times are stored in the collection time field 207.

When the performance information collection unit 109 and the configuration information collection unit 110 collect information by way of the virtual environment monitor unit 108 from the resource control unit 120 of the managed physical server, this collected information is recorded in the virtual server resource table 200 as an initial record or as rewritten (refresh) record.

The pool generator unit 107 defines the resource acquisition pool 114 and sets a "true" in the acquisition flag field 206 when recording this resource acquisition pool 114 in the virtual server resource table 200.

The resource capacity scheduled for entity acquisition is stored in the scheduled acquisition resource capacity field 208. The scheduled acquisition resource capacity field 208 stores the requested resource capacity acquired by the resource acquisition pool or the resource acquisition virtual server. The value of the acquired resource capacity field 205 is gradually increased until reaching the target figure for the resource capacity to acquire as shown in the scheduled acquisition resource capacity 208. The scheduled acquisition resource capacity field 208 stores a value that is the sum of scheduled values in the resource acquisition requests corresponding to the resource acquisition pool or the resource acquisition virtual server.

FIG. 4 is a drawing showing one example of a work/task table 300. The work/task table 300 groups the work-task system from the standpoint of the work executed by the virtual server 113, and records resource management information such as resource allocation information, and resource lending schedule information for each work-task system.

The work/task table 300 contains a work-task field 301, a work-task priority level field 302, a requested resource capacity field 303, a scheduled period field 304, a virtual server field 305, and a system requirements field 306.

The work-task field 301 stores recognition information for the work-task system. This recognition information is key information for the record that is recorded in the table.

Priority level information for the work-task system is stored in the work-task priority level field 302. This information is information set by the administrator according to the degree of importance in the work-task system. The work-task priority level is for example a value established according to the service level or reliability and so on required by the work-task system. More specifically, the level of priority is low when lending resources in a development environment; and the level of priority is high in ticket sales systems where a high service level is required.

In a state where multiple work-task systems are operating in the managed physical server 101, the resource allocation unit 116 correctly distributes resources to the multiple work-task systems by allocating resources in the resource acquisition pool 114 to the virtual servers 113 for each work-task, based on the priority level.

The resource capacity requested for the work-task system is registered in the requested resource capacity field 303. Information on the time scheduled for lending resources from the managed physical server 101 to the work-task system specified by the work-task field 301 is registered in the scheduled period field 304.

Information for recognizing the virtual server 113 that configure the work-task system specified in the work-task field 301 is registered in the virtual server field 305.

The system condition information requested for the work-task system specified in the work-task field 301 is registered in the system requirements field 306. For example, the condition that the multiple virtual servers 113 configuring the work-task system must each operate on different managed physical servers 101, or conversely the condition that the multiple virtual servers 113 must operate on the same managed physical server 101 is registered in the system requirements field 306.

The former condition is set in order to enhance reliability assuming that the hardware in the managed physical server 101 will fail. The latter condition is set in order to boost shared usage of the managed physical servers 101 memory, increase the cache hit rate and speed up the work-task processing.

The work task monitor unit 105 generates or rewrites (refreshes) the work-task table 300 based on the information that the performance information collection unit 109 and the configuration information collection unit 110 collected from the managed physical server.

FIG. 5 is a drawing showing one example of the physical server resource table 400. The physical server resource table 400 is a table for managing the resource usage status of the physical server.

The physical server resource table 400 contains a physical server field 401, a total resource capacity field 402, an available resource capacity field 403, and a non-acquired resource capacity field 404.

Information for recognizing the managed physical servers 101 is registered in the physical server field 401. This recognition information is key information for each record in the physical server resource table.

The total size of the resource capacity contained in a certain managed physical server 101 specified by the physical server field 401 is registered in the total resource capacity field 402.

Among the resource capacity contained in a certain managed physical server 101 specified by the physical server field 401; the unused resource capacity not assigned even to any of the virtual servers 113 or resource acquisition pools 114, or namely a value in which the total value in the actual allocation resource capacity field 203 (FIG. 3) belonging to the same physical server as the physical server field 401 (FIG. 5) subtracted from the total resource capacity field 402, is recorded in the available resource capacity field 403.

Among the resource capacity contained in a certain managed physical server 101 specified by the physical server field 401; the resource capacity not acquired in the resource acquisition pools 114 is recorded in the non-acquired resource capacity field 404. This value is equivalent to a value in which the total value in the acquired resource capacity field 206 (FIG. 3) belonging to the same physical server as the physical server field 401 (FIG. 5) subtracted from the total resource capacity field 402.

This physical server table 400 is generated or rewritten by the resource monitor unit 103 based on the collected information by the performance information collection unit 109 and the configuration information collection unit 110.

Figure 6:
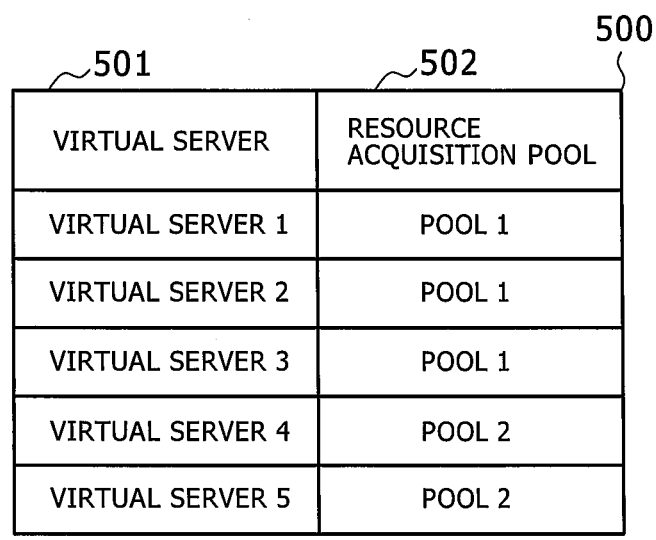
FIG. 6 is one example of a linking table.

FIG. 6 is a drawing showing one example of the linking table 500. The corresponding relation between the virtual servers 113 and the resource acquisition pools 114 (abbreviated to "pool" in FIG. 6) supplying resources to the virtual server is recorded in the linking table 500. The virtual server assigned to the resource acquisition pool is recorded in the linking table 500 at the stage where the placement setter unit 111 sets the physical server 101 where the virtual server 113 must be deployed.

The linking table 500 contains a virtual server field 501 and a resource acquisition pool field 502. Recognition information for the virtual server 113 is recorded in the virtual server field 501. Information for recognizing the resource acquisition pools 114 for assigning acquired resources to the virtual server 113 specified in the virtual server field 501 is registered in the resource acquisition pool field 502.

On the other hand, when the period for utilizing the virtual server has ended, the administrator deletes the virtual server entry from the linking table. If the resource acquisition pool corresponding to the virtual server does not also correspond to other virtual servers at this time, then the administrator deletes that resource acquisition pool from the linking table.

Figure 7:
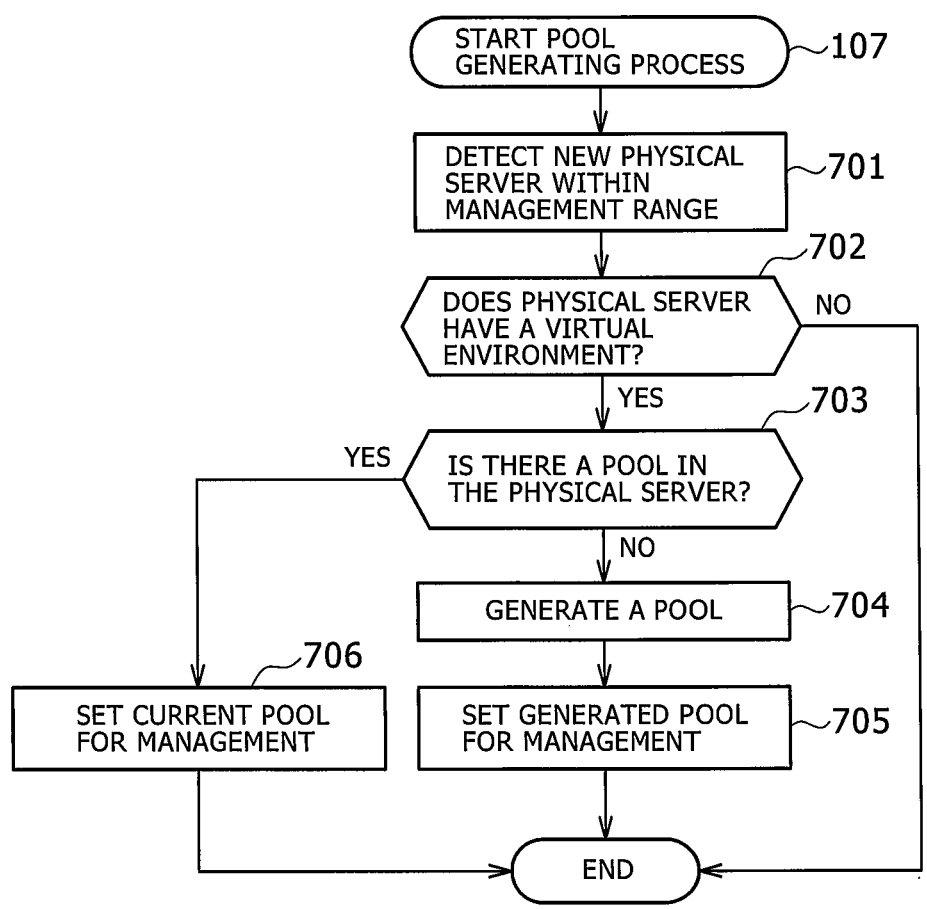
FIG. 7 is a flowchart showing the process for generating the resource acquisition pool in the managed physical computer.

FIG. 7 is a flowchart showing the operation of the pool generator unit 107 (FIG. 1), or namely the process for generating the resource acquisition pool 114 (abbreviated to "pool" in FIG. 7) in the managed physical server 101. The pool generator unit 107 executes discovery by way of the network 115A (FIG. 2) and detects new managed physical servers 101 if present within the management range (step 701).

The pool generator unit 107 accesses the detected physical server 101, analyzes the software environment in the physical server 101 and decides whether or not there is a virtual environment within the managed physical server (step 702).

When the pool generator unit 107 makes an affirmative decision in step 702, the unit 107 decides whether or not to set a resource acquisition pool 114 in the physical server 101 based on performance information and configuration information in the managed physical server 101 (step 703).

When the pool generator unit 107 decides in step 703 that there is no resource acquisition pool, the unit 107 provides a resource acquisition pool 114 create command to the hypervisor (resource control unit 120) of the physical server 101 (step 704).

The pool generator unit 107 registers the created resource acquisition pool into the virtual server resource table 200 (FIG. 3) as a managed object (step 705). More specifically, the pool generator unit 107 generates a new record in the virtual server resource table 200, records an identifier for the created resource acquisition pool 114 into the virtual server field 201, records the managed physical server 101 that generated the resource acquisition pool into the physical server field 202, and records a "true" in the acquisition flag field 206. Information on the resource capacity collected by the performance information collection unit 109 is recorded in the actual allocation resource capacity field 203 and requested resource capacity field 204. The pool generator unit 107 sets the scheduled value in the acquired resource capacity field 205.

The pool generator unit 107 terminates the flowchart when the unit 107 makes a negative decision in step 702. When decided in step 703 that there is a resource acquisition pool, the currently used resource acquisition pool is set as the managed object (step 706) and the flowchart is terminated.

Figure 8:
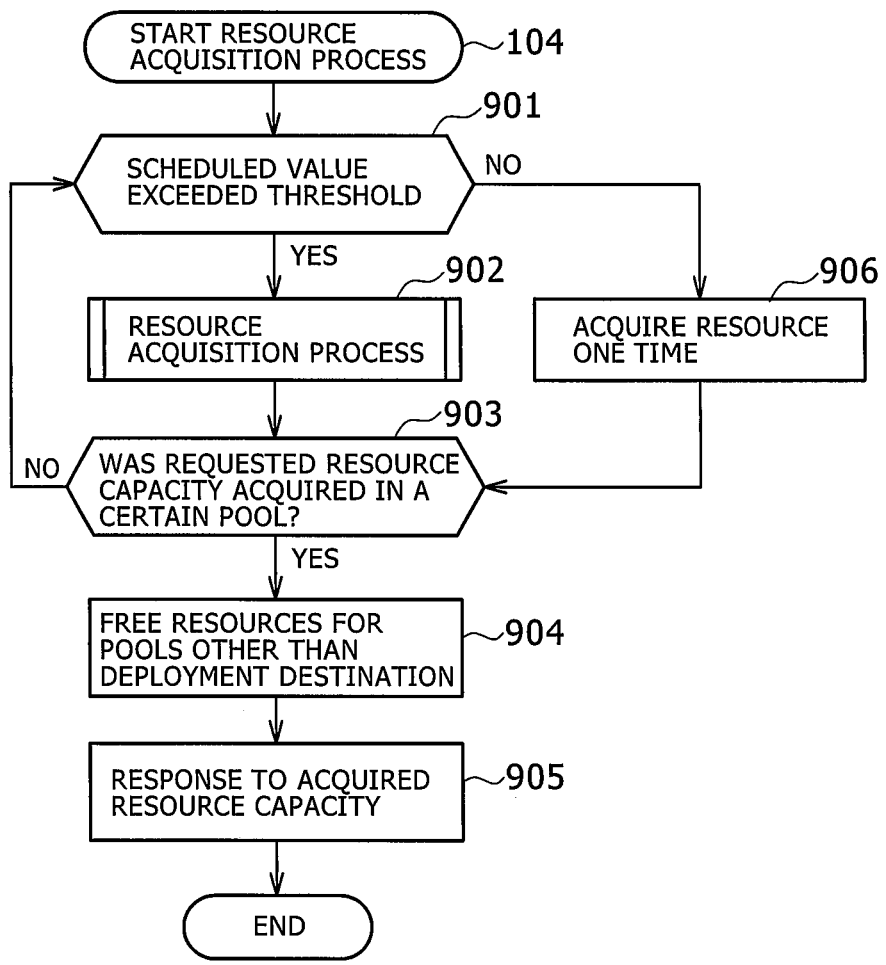
FIG. 8 is a flowchart showing the process for acquiring resources in the resource acquisition pool.

FIG. 8 is a flowchart showing the operation of the resource acquisition unit 104 (FIG. 1) or namely is a flowchart of the process for acquiring resources in the resource acquisition pool. The resource acquisition unit 104 executes the process of the flowchart in FIG. 8 if setting a managed physical server as the deployment destination for a new virtual server.

In a state where the virtual server is operating on the physical server, resources must again be acquired for the resource acquisition pool, when the resource acquisition unit attempts to assign resources to the virtual server because the resources from the resource acquisition pool 114 have already been discharged to the virtual server 113.

Whereupon the resource acquisition unit 104 sets a scheduled value serving as the resource capacity required by the new virtual server based on the information input from the monitor terminal 102, and calculates a scheduled value to set in the resource acquisition pool.

The resource acquisition unit 104 acquires a threshold value for deciding the size of the scheduled value from the specified range of the main memory device 601, and compares the scheduled value with threshold value (step 901).

The resource acquisition unit 104 searches the entity recognition field 201 (or virtual server and resource acquisition pool recognition field 201) in FIG. 3 when the scheduled value is below the threshold value (No: step 901), sets a scheduled value in an unused resource acquisition pool 114 where there is no acquired resource capacity, and sends a command to the resource control unit 120 of this resource acquisition pool 114. The resource control unit 120 that received this transmitted command acquires a resource capacity that is equivalent to the scheduled value in the resource acquisition pool 114 (step 906).

The scheduled value is at this time smaller than the threshold value, so the resource acquisition unit 104 can acquire the resource capacity required by the virtual server all at one time in the resource acquisition pool 114 since the managed physical server 101 has sufficient available capacity to supply a resource capacity equivalent to the scheduled value. Rather than using the threshold value, the resource acquisition unit 104 may compare the available capacity of the physical server with the scheduled value.

On the other hand, when the resource acquisition unit 104 decides that the scheduled value exceeds the threshold value (Yes: Step 901) the resource acquisition unit 104 sends continuous resource acquisition requests to the resource control unit 120 for the unused resource acquisition pool 114 so that a resource capacity equivalent to the scheduled value is gradually acquired over multiple times in the resource acquisition pool 114, (described in detail in FIG. 9: step 902).

Conventional server hosting business operators in many cases cannot allocate the required resource capacity to the virtual server all at one time, however when the resource capacity requested by the virtual server that is attempting to deploy at the physical server is small, then the management server acquires this capacity all at one time by way of steps 901, 902, 906; and when the requested resource capacity is large, the management server attempts to reliably acquire the target requested resource capacity by the time the virtual server starts operating, by continuously accumulating the resource capacity that is smaller than the requested resource capacity.

The performance information collection unit 109 and configuration information collection unit 110 acquire the resource acquisition progress status in the resource acquisition pool from the physical server 101, and newly register the information in the actual allocation resource capacity field 203, the requested resource capacity field 204, and the acquired resource capacity field 205.

The acquired resource capacity is newly registered in the actual allocation resource capacity field 203, the requested resource capacity field 204, and the acquired resource capacity 205 as the acquisition of resource to the resource acquisition pool 114 gradually progresses.

When acquisition of the target resource capacity for the resource acquisition pool 114 is complete, a resource capacity equivalent to the scheduled value is registered in the acquired resource capacity 205.

FIG. 3 shows the state prior to allocation of resources to the virtual server where the pool 1 and pool 3 resource acquisition has ended. Pool 2 is in a state prior to resource acquisition after discharge of resources to the virtual server.

Next, the resource acquisition unit 104 refers to the acquired resource capacity field 205 (FIG. 3) to decide (step 903) if a requested resource capacity equivalent to the scheduled value can be acquired for at least one of the resource acquisition pools (abbreviated to "pool" in FIG. 8). When the resource acquisition unit 104 decides the value can be acquired, the resource acquisition pool 114 in which to deploy the virtual server is decided.

In step 903 when the resource acquisition unit 104 decides that acquisition of resources for at least one resource acquisition pool has completed, the resource acquisition unit 104 decides on the virtual server that should be deployed in the physical server for that one resource acquisition pool. On the other hand, when acquisition of resources for plural resource acquisition pools has completed, then a specified resource acquisition pool is set as the deployment destination for the virtual server in compliance with a specified selection criterion.

The selection criterion is the size of the available capacity (FIG. 5: 403) of the physical server for the resource acquisition pool per time before and after the requested resource capacity acquisition was completed.

The resource acquisition unit 104 subsequently releases the acquired resource region for a resource acquisition pool not selected as the deployment destination (step 904), and clears the actual allocation resource capacity field 203, the requested resource capacity field 204, and the acquired resource capacity field 205.

The threshold value is generally set in advance for the resource acquisition unit 104 by the management user or administrator. However, the resource acquisition unit 104 may set the threshold value according to the state that the flowchart in FIG. 8 is executed or the resource acquisition unit 104 may dynamically change the threshold value via a specified default value or a threshold setting program according to the available resource capacity of the managed physical server (FIG. 4) or the acquired resource capacity (FIG. 3), etc.

A resource capacity difficult to acquire all at one time may for example be calculated as the threshold value based on factors such as the number of virtual severs per managed physical server, specifications for the managed physical server, or the available size of the physical server.

Next, the resource control unit 120 for the resource acquisition pool set as the virtual server deployment destination, replies with the acquired resource information to the resource management unit 103 of the management server 100 (step 905).

The resource acquisition unit 104 further registers the mutual relation between the virtual server 113 and the resource acquisition pool 114 in the linking table 500. As shown in FIG. 1, besides setting the virtual server outside the resource acquisition pool 114, the resource management unit 103 can also set the virtual server within the resource acquisition pool. The resource management unit 103 can also set another resource acquisition pool within the resource acquisition pool. In other words, the resource management unit 103 can arrange the resource acquisition pool in layers.

Executing the process for acquiring resources for multiple physical servers was described using FIG. 8; however, the management server 100 may also attempt acquiring resources by setting the priority in order of physical servers having a high probability of acquiring the requested resource capacity, based on results (history log information in FIG. 3) from monitoring resources collected in the past.

Figure 9:
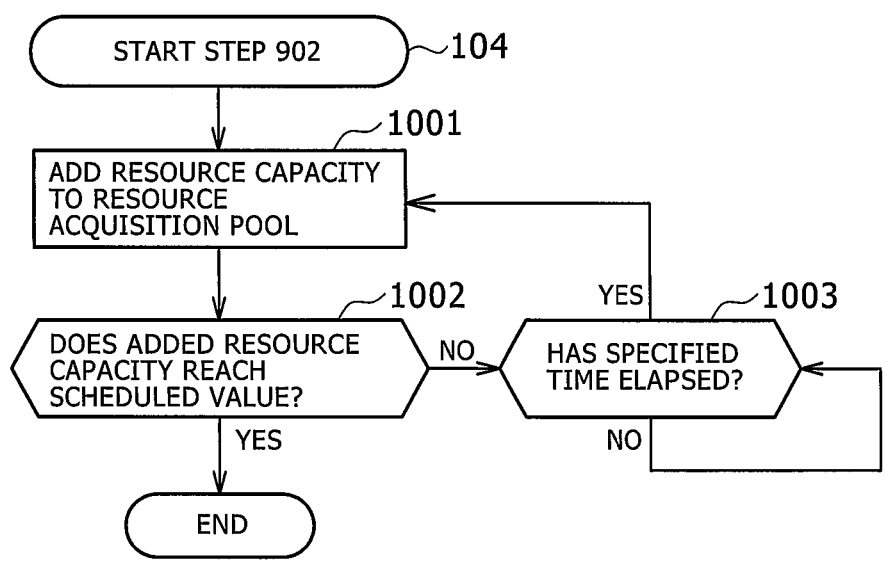
FIG. 9 is a flowchart showing in detail the processing (step 902 in FIG. 8) for the resource acquisition unit to gradually acquire the resource capacity required by the virtual machine in the resource acquisition pool.

FIG. 9 is a flowchart showing in detail the process (step 902 in FIG. 8) for gradually acquiring the resource capacity requested by the virtual server in the resource acquisition pool by the resource acquisition unit 104.

The resource acquisition unit 104 sets a coefficient value that is the same as the threshold, or lower than the threshold, adds the coefficient value to the guaranteed value in the resource acquisition pool 114 (step 1001), gradually increases the guaranteed value in the resource acquisition pool and sends this value to the resource control unit 120. The resource control unit 120 acquires an added resource capacity equivalent to the difference with the guaranteed value (coefficient value) in the resource acquisition pool 114.

This coefficient value may be a fixed value or may be a value calculated as needed by the resource acquisition unit 104 according to the critical level of the physical server or namely the available resource capacity (FIG. 4).

The resource acquisition unit 104 adds a resource capacity equivalent to the coefficient value in the acquired resource capacity 205 for the resource acquisition pool of the virtual server resource table (FIG. 3), and decides whether or not the value after addition has reached the required resource capacity (value in scheduled acquisition resource capacity 208) (step 1002).

If the decision is negative (not reached resource capacity) then the processing subsequently returns to step 1001 after a fixed period of time has elapsed (step 1003), and the resource acquisition unit 104 sends a request to the resource control unit 120 to acquire additional resource capacity equivalent to the coefficient value.

By repeating steps 1001 through step 1003, the resource acquisition unit 104 can continuously acquire a resource capacity for the virtual server that must be deployed in the physical server in the resource acquisition pool 114.

If the resource control unit 104 cannot acquire a resource capacity that reaches the required resource capacity even after repeating the above processing a specified number of times, then the administrator notifies the user to warn that resources cannot be acquired for the virtual server.

After deciding from the result in the flowcharts in FIG. 8 and FIG. 9 that the resource acquisition pool 114 has acquired the necessary resource capacity, the placement setter unit 111 decides to deploy the virtual server in a specified physical server where the resource acquisition pool 114 is located by the time that the virtual server starts operating.

In this deployment process, the resource control unit 120 for the specified physical server stores the virtual server 113 within the resource acquisition pool 114, and allocates the acquired resource region for resource acquisition pool 114 to the virtual server 113. The resource control unit 120 subsequently transfers the resource capacity of resource acquisition pool 114 to the virtual server 113 by releasing the virtual server 113 to outside the resource acquisition pool 114. The reduction in resource capacity of the resource acquisition pool 114 and the increase in resource capacity of the virtual server are recorded in the table in FIG. 2.

The resource acquisition unit 104 may adjust the sampling interval of the acquired resource capacity for the resource acquisition pool from the date that the virtual server is deployed in the physical server. The management server 100 may shorten the sampling intervals if the date that the virtual server will be deployed in the physical server is near and may actively acquire resources.

Figure 10:
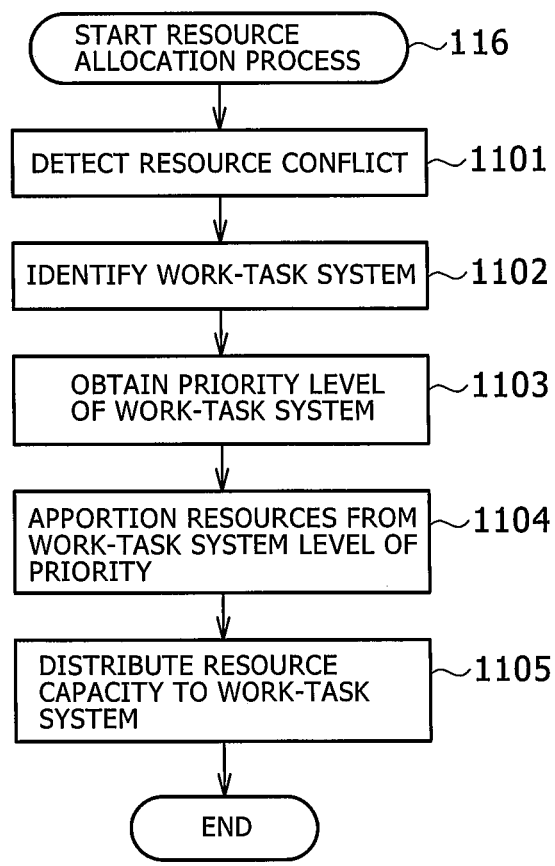
FIG. 10 is a flowchart showing the processing for distributing resources from the resource acquisition pool to the virtual machine according to the order of priority of the work-task system operated by the virtual machine.

FIG. 10 shows an example of the resource allocation processing by the resource allocation unit 116. FIG. 10 is also a flowchart showing the process for distributing resources from the resource acquisition pool 114 in the virtual server according to the order of priority in the work-task system operated by the virtual server 113.

The resource allocation unit 116 assigns resources from the same resource acquisition pool 114 to the multiple virtual servers or in other words detects conflicts or competition for resources among the multiple virtual servers 113 (step 1101).

Next, the resource allocation unit 116 refers to the work-task table in FIG. 4 and specifies the work-task system to execute by utilizing the resource for which the multiple virtual servers are competing (step 1102).

The resource allocation unit 116 next (FIG. 4: 302) acquires the work-task system order of priority (step 1103), and apportions the resource capacity of the resource acquisition pool among the multiple virtual servers according to the order of priority (step 1104). The resource allocation unit 116 for example may sequentially distribute the requested resource capacity from the resource acquisition pool of the virtual server for the work-task system in order of high priority.

The resource allocation unit 116 next sends requests regarding assignment of the apportioned resource capacity to the resource control unit 120 of the physical server where the virtual server is deployed, and distributes the resource capacity required for each of the multiple work-task system (virtual server) from the resource acquisition pool 114 (step 1105).

Figure 11:
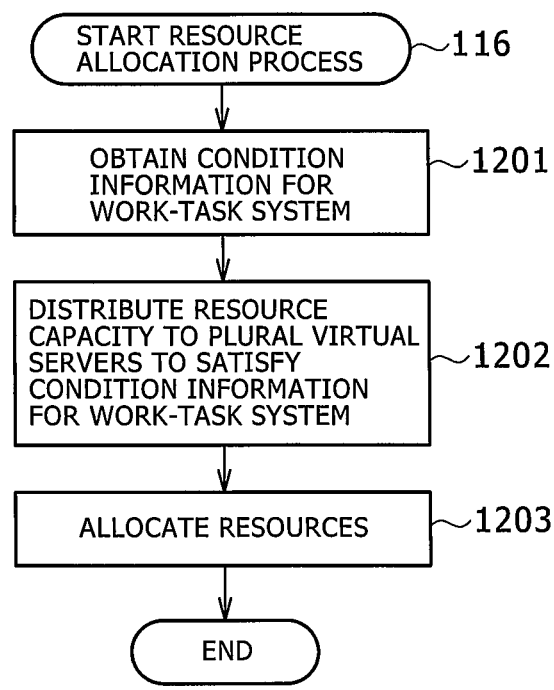
FIG. 11 is a flowchart showing the processing for distributing resources from the resource acquisition pool to the virtual machine according to the system structure of the work-task system operated by the virtual machine.

FIG. 11 shows an example of the resource allocation processing by the resource allocation unit 116. FIG. 11 is a flowchart showing the process for distributing resources from the resource acquisition pool to the virtual server according to the system configuration of the work-task system operated by the virtual server 113. The system configuration of the work-task system is control or management information relating to the system requirements field 306 shown in the work-task table in FIG. 4.

When deploying plural virtual severs in the computer system, the administrator searches the work-task system conditions implemented by the multiple virtual servers such as work-task system conditions for the Web3 layer system comprised for example from multiple virtual machines, and attempts to acquire the collective resources for the multiple virtual machines.

In that case, the administrator sets whether to deploy the multiple virtual servers in different physical servers or deploy the multiple virtual servers in the same physical server; and moreover sets whether to acquire resources for the multiple virtual servers from the same resource acquisition pool or acquire the multiple virtual servers from different pools. Control is therefore necessary for distributing resources from the resource acquisition pool to the multiple virtual servers according to the work-task system conditions in the virtual server.

The resource allocation unit 116 acquires system configuration condition information on the work-task system (step 1201). Next, the resource allocation unit 116 distributes resources (step 1202) or namely the resource capacity acquired in the resource acquisition pool 114 to the multiple virtual servers so as to satisfy conditions for system structural information acquired in step 1201, and allocates the resource capacity to the virtual server according to the distributed value (step 1203).

The system conditions may for example include a system configuration that places the multiple virtual servers 113 in a separate managed physical server 101 in order to minimize effects from hardware breakdowns and improve reliability. Conversely, the system conditions may include a system configuration that places the multiple virtual servers 113 in the same managed physical server 101 with the objective of high-speed operation. In this case, high speed operation can be achieved since the memory information is jointly shared and network communications can be copied into the memory.

Figure 12:
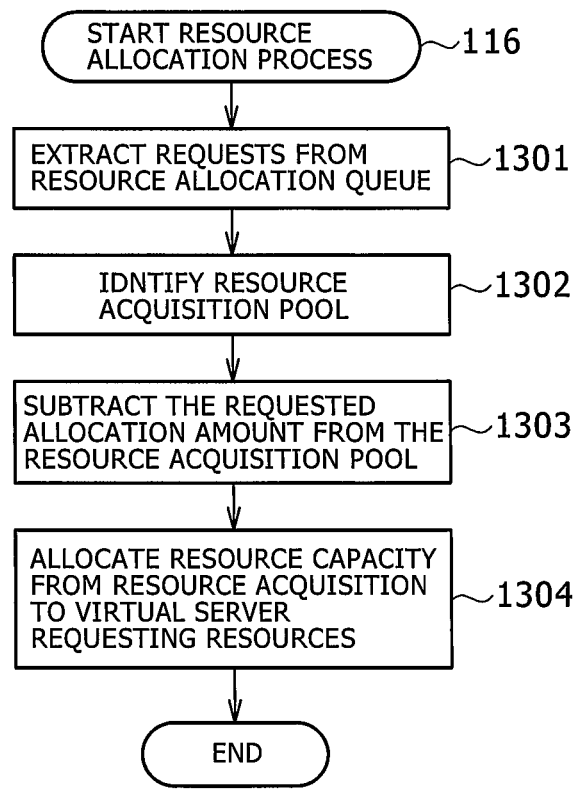
FIG. 12 is a flowchart showing the processing for managing that allocation of resources to the virtual machine by way of queues.

FIG. 12 shows an example of the resource allocation processing by the resource allocation unit 116. FIG. 12 is a flowchart showing the process for managing the allocation of virtual server resources by way of queues. The resource allocation unit 116 that internally monitors the queues for queuing the resource allocation request, extracts the allocation request from the resource allocation queue (step 1301), and specifies the resource acquisition pool 114 containing resource capacity for the extracted allocation request (step 1302).

Next, among information for managing the virtual server resource table 200, the resource allocation unit 116 deducts the requested allocation capacity (scheduled value) from the values in the acquired resource capacity field 205 and the scheduled acquisition resource capacity field 208 for the record equivalent to the specified resource acquisition pool 114 (step 1303). The resource allocation unit 116 also sets a value calculated by deducting the requested allocation capacity (scheduled value), into the guaranteed value of the specified resource acquisition pool 114.

The resource allocation unit 116 next allocates the resource capacity (scheduled value) requested allocation from the specified resource acquisition pool 114, to the virtual server corresponding to the request (step 1304).

Figure 13:
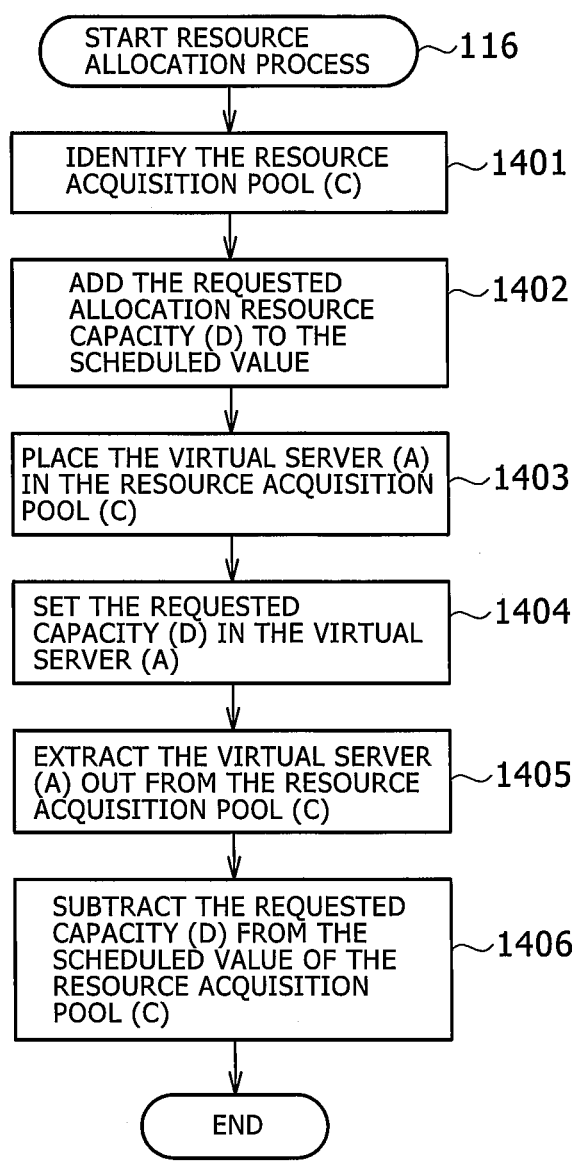
FIG. 13 is a flowchart showing the processing for taking over the resource capacity acquired for the virtual machine from the resource acquisition pool.

FIG. 13 is a specific example of the resource allocation processing by the resource allocation unit 116. The flowchart in this figure describes the processing for handover of the resource capacity acquired from the resource acquisition pool 114 to the virtual server 113.

This handover stores the virtual server 113 in the resource acquisition pool 114, and next executes the process releasing this virtual server 113 from storage.

The resource allocation unit 116 specifies a resource acquisition pool (C) to allocate as the acquired resource capacity corresponding to the virtual server (A) for new deployment on the physical server, from the corresponding table 400 (step 1401).

Next, the resource allocation unit 116 adds the requested allocation resource capacity (D) in the virtual server (A) to the resource acquisition pool (C) scheduled value (step 1402). The resource allocation unit 116 places the virtual server (A) in the resource acquisition pool (C) (step 1403).

The resource allocation unit 116 next adds the value of the requested allocation resource capacity (D) portion to the guaranteed value of the virtual server (A) (step 1404). The resource allocation unit 116 further extracts the virtual server (A) from the resource acquisition pool (C) (step 1405). The resource allocation unit 116 subtracts the requested allocation resource capacity (D) portion in the virtual server (A) from the guaranteed value of the resource acquisition pool (C) (step 1406).

The resource control unit 120 changes the guaranteed allocated resource handed over from the resource acquisition pool (C) to the virtual server (A) into a virtual server (A) due to a request from the resource allocation unit 116. Fluctuations in the resource capacity of the resource acquisition pool (C) and the virtual server (A) are registered by the resource allocation unit 116 in the resource allocation table 200.

In the resource handover from the resource acquisition pool to the virtual server, the resource allocation unit 116 may synchronize the pool and server, and increase the guaranteed value of virtual server 113 while reducing the scheduled value of resource acquisition pool 114, to allow acquisition of resources released from the resource acquisition pool by the virtual server.

Figure 14:
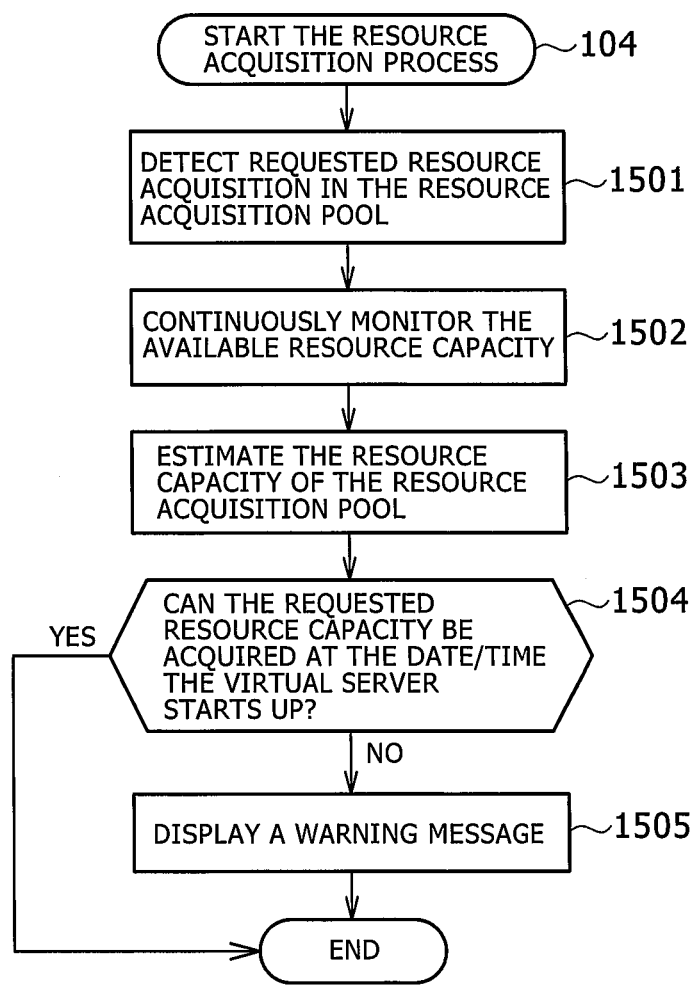
FIG. 14 is a flowchart for verifying whether or not the resource capacity required for the virtual machine can be acquired prior to executing the resource acquisition process.

FIG. 14 is a flowchart for verifying whether or not the resource capacity required for the virtual machine can be acquired in the resource acquisition pool 114 prior to executing the resource acquisition process.

The resource acquisition unit 104 simulates the flowchart process in FIG. 9, when attempting to acquire a resource capacity exceeding the threshold value (FIG. 8) in the resource acquisition pool 114.

To accomplish that action, the resource acquisition unit 104 consecutively searches the physical server resource table 400 (FIG. 5) when a resource acquisition request is detected in the resource acquisition pool (step 1501); and monitors the available resource capacity 403 of the physical server (step 1502).

The resource acquisition unit 104 estimates the increase (FIG. 9) in resource capacity per each cycle in the process for consecutively acquiring resource capacity in the resource acquisition pool 114 from the trend in available resource capacity of the physical server; and predicts trends in future capacity increases of the resource acquisition pool 114 (step 1503).

The increase in acquired resource capacity was estimated here from trends in the available resource capacity of the physical server; however, the resource acquisition process may instead be actually performed as a trial for several times or for a fixed trial period, and an estimate of the resource capacity acquirable in the future made from the value thus obtained.

The resource acquisition unit 104 decides based on the prediction results whether or not the required resource capacity set as the scheduled value in the resource acquisition pool 114 can be acquired by the scheduled start time of the virtual server (step 1504).

When the resource acquisition unit 104 decides that the requested allocation resource capacity cannot be acquired by the scheduled start time even if the continuous acquired quantity of resource capacity is increased within the tolerance range, the resource acquisition unit 104 displays a warning message on the monitor terminal (step 1505). The administrator receives this warning message and can request the user to delay the start of the virtual server or lower the virtual server guaranteed value. Based on the correction request from the user, the management server 100 again executes the process in the flowchart in FIG. 14, and after verifying a positive decision for step 1504 (i.e. can acquire resource by virtual server start time), the administrator can start actually acquiring the required resource capacity into the resource acquisition pool.

Figure 15:
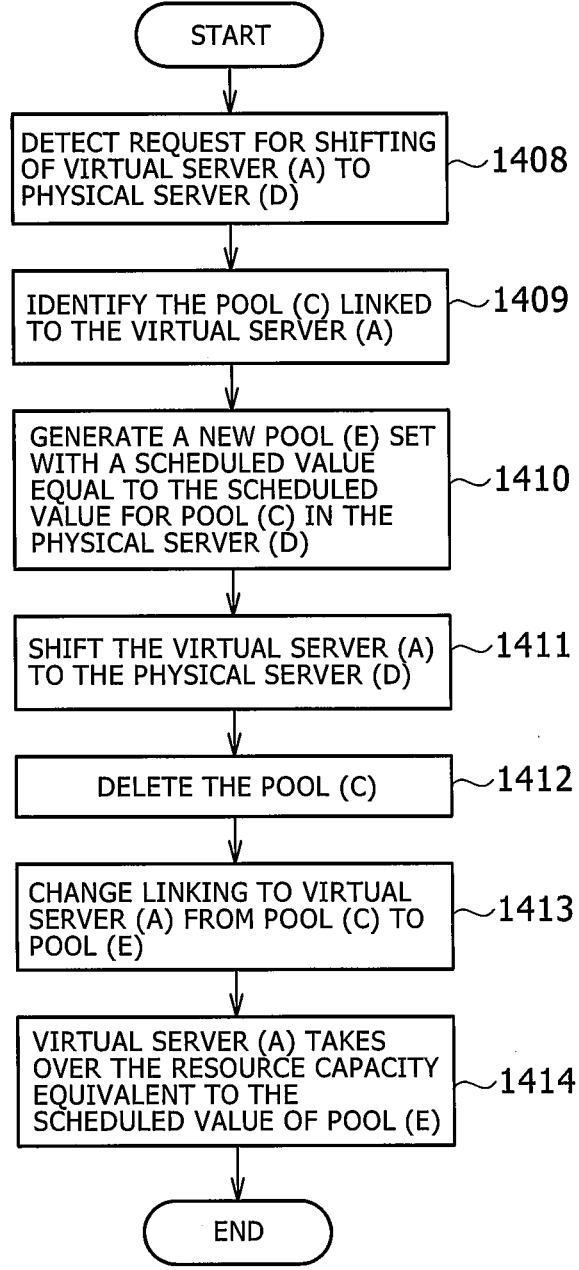
FIG. 15 is a flowchart showing processing of a request for shifting the virtual server to another managed physical computer.

FIG. 15 is a flowchart showing processing of a request to shift the virtual server 113 to another managed physical server 101. When the pool generator unit 107 receives a request from the monitor terminal 102 to shift the virtual server (A) to the managed physical server (D) (step 1408), checks the linking table 500, and specifies a resource acquisition pool (C) that is linked to the virtual server (A) (step 1409).

Next, the pool generator unit 107 generates a new resource acquisition pool (E) set with the scheduled value based on the scheduled value for resource acquisition pool (C) in the managed physical server (D) (step 1410).

The pool generator unit 107 further shifts the virtual server (A) to the managed physical server (D) (step 1411), and deletes the resource acquisition pool (C) (step 1412).

The pool generator unit 107 also changes the corresponding mapping (linking) to the virtual server (A), from the resource acquisition pool (C) to the resource acquisition pool (E) (step 1413) and records the contents of this change in the linking table.

Next, the resource acquisition unit 104 executes the process for handover of the resource capacity equivalent to the scheduled value in resource acquisition pool (E) to the virtual server (A) (step 1414).

Figure 16:
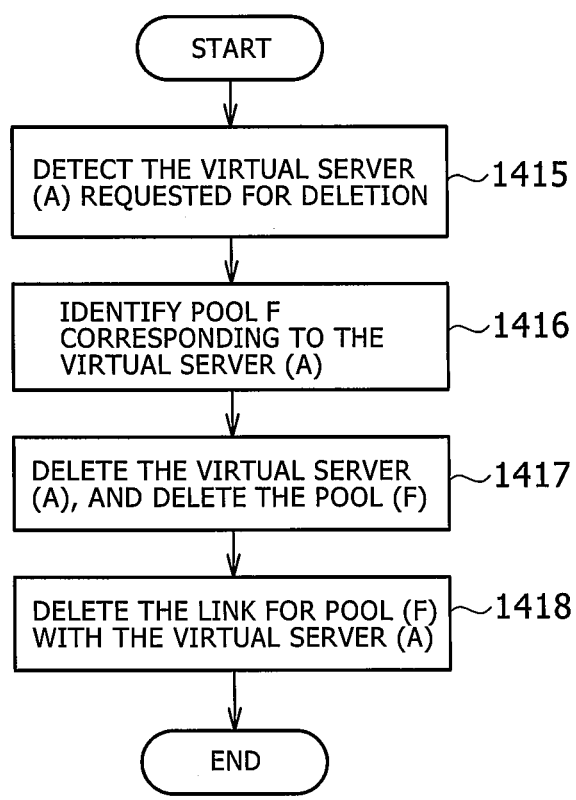
FIG. 16 is a flowchart of execution of processing for deleting the virtual server.

FIG. 16 is a flowchart of the deletion process executed in the virtual server 113. When a request is received to delete the virtual server (A) from the monitor terminal 102 (step 1415), the pool generator unit 107 specifies a resource acquisition pool (F) corresponding to the virtual server (A) (step 1416).

The pool generator unit 107 next deletes the virtual server (A) and also deletes the resource acquisition pool (F) corresponding to the virtual server (step 1417). The pool generator unit 107 deletes the correspondence between the resource acquisition pool (F) and the virtual server (A) from the linking table 500 (step 148).

The pool generator unit 107 checks the acquisition flag 206 for the table in FIG. 3, and if the virtual server (described later on) is for allocating resource to the virtual server in the work-task system (flag: true) the pool generator unit 107 do not delete this virtual server.

Figure 17:
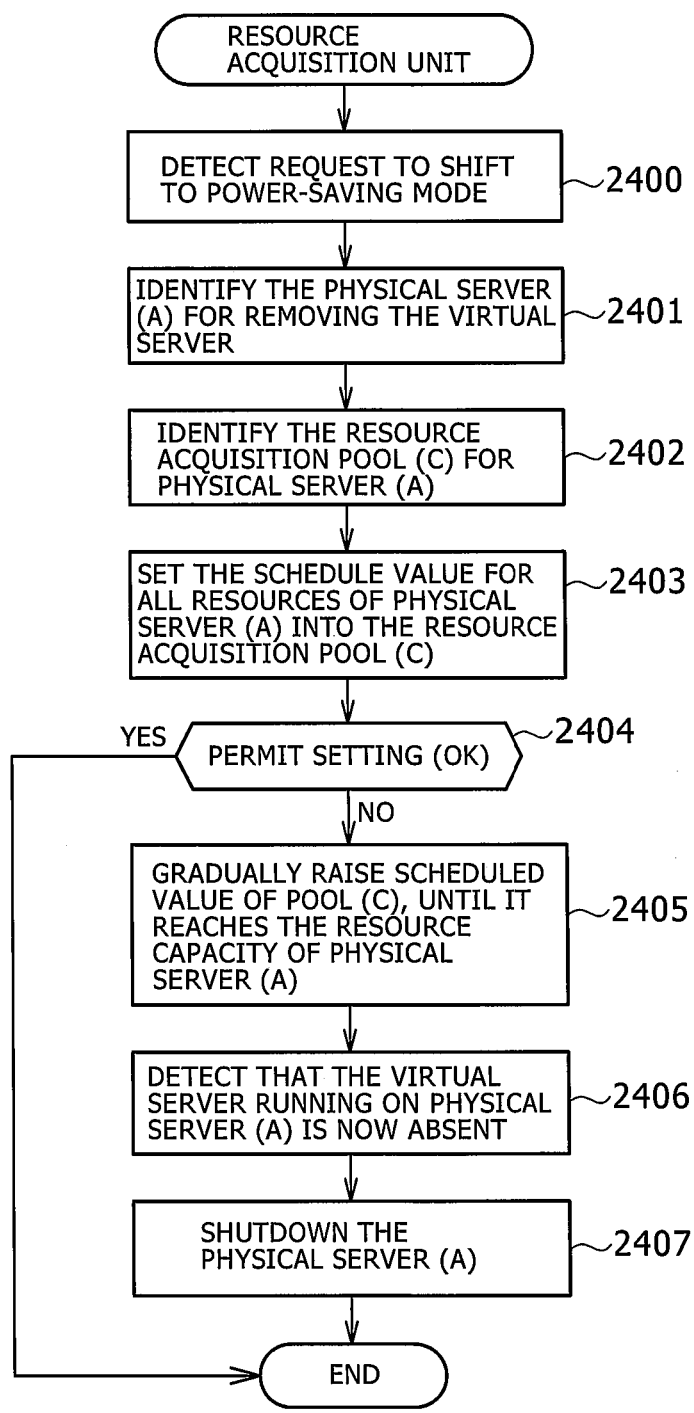
FIG. 17 is a flowchart of the process when removing the virtual server from the physical server when the physical server was set to power-saving mode.

FIG. 17 is a flowchart showing the removing of the virtual server from the physical server when the physical server was set to power-saving mode. When the management server 100 detects from the monitor terminal 102, a request to shift the computer system to power-saving mode (step 2400), the resource monitor unit 103 specifies a physical server (A) ideal for removing all virtual servers among the multiple managed physical servers to another physical server (step 2402). One such type of physical server is physical servers having the lowest operating rate.

The resource monitor unit 103 subsequently searches the linking table 500 (FIG. 6) and specifies a resource acquisition pool (C) corresponding to the virtual server (B) in physical server (A) (step 2403).

Next, the resource monitor unit 103 sets a scheduled value for the total resource capacity of physical server (A) in the resource acquisition pool (C) (step 2404), and decides whether or not that scheduled value can be set in the resource acquisition pool (C) (step 2405).

In step 2405, the resource monitor unit 103 compares the scheduled value with the threshold value, and if the scheduled value is lower than the threshold value the resource monitor unit 103 decides that all scheduled values can be set all at one time in the resource acquisition pool. On the other hand, when decided that the scheduled value exceeds the threshold value, the resource monitor unit 103 decides that the guaranteed value for the scheduled value cannot be set all at one time in the resource acquisition pool (C), gradually raises the guaranteed value of resource acquisition pool (C) up to the entire resource capacity portion of physical server (A). The resource monitor unit 103 deletes the guaranteed value for the virtual server (B) that is to be removed from the physical server (A).

When a scheduled value was set in resource acquisition pool (C) all at one time or when executing step 2406, and the resource capacity from the virtual server (B) is recovered in the resource acquisition pool (C) by finally setting the scheduled value in the resource acquisition pool (C), and the resource monitor unit 103 consequently detects there is no virtual server operating on the physical server (A) (step 2406); the management server 100 shifts the physical server (A) to a power-saving mode (shutdown mode, etc.). The resource monitor unit 103 searches the virtual server resource table 200 and can attain step 2406 by confirming that there is no virtual server containing an actual allocation resource capacity 203 in the physical server (A).

By executing the process in the flowchart in FIG. 17, the management server 100 can cluster the virtual server (B) in another physical server and moreover dynamically shift the physical server (A) to a non-used state that does not consume resources and so in that way change the physical server (A) to a power-saving state.

When clustering the virtual server (B) from the physical server (A) to another physical server is attempted without recovering the resource in the resource acquisition pool (C) from the virtual server (B); a so-called "ping pong effect" occurs due to a load equalizing program applied to the computer system causing the virtual server (B) to move back and forth between the movement source physical server (A) and the other physical server that is the movement destination.

However, this above described "ping pong effect" can be avoided by recovering that resource in resource acquisition pool (C) in the movement source physical server (A) of the virtual server (B) even in system environments where a load equalizing system is operating.

Figure 18:
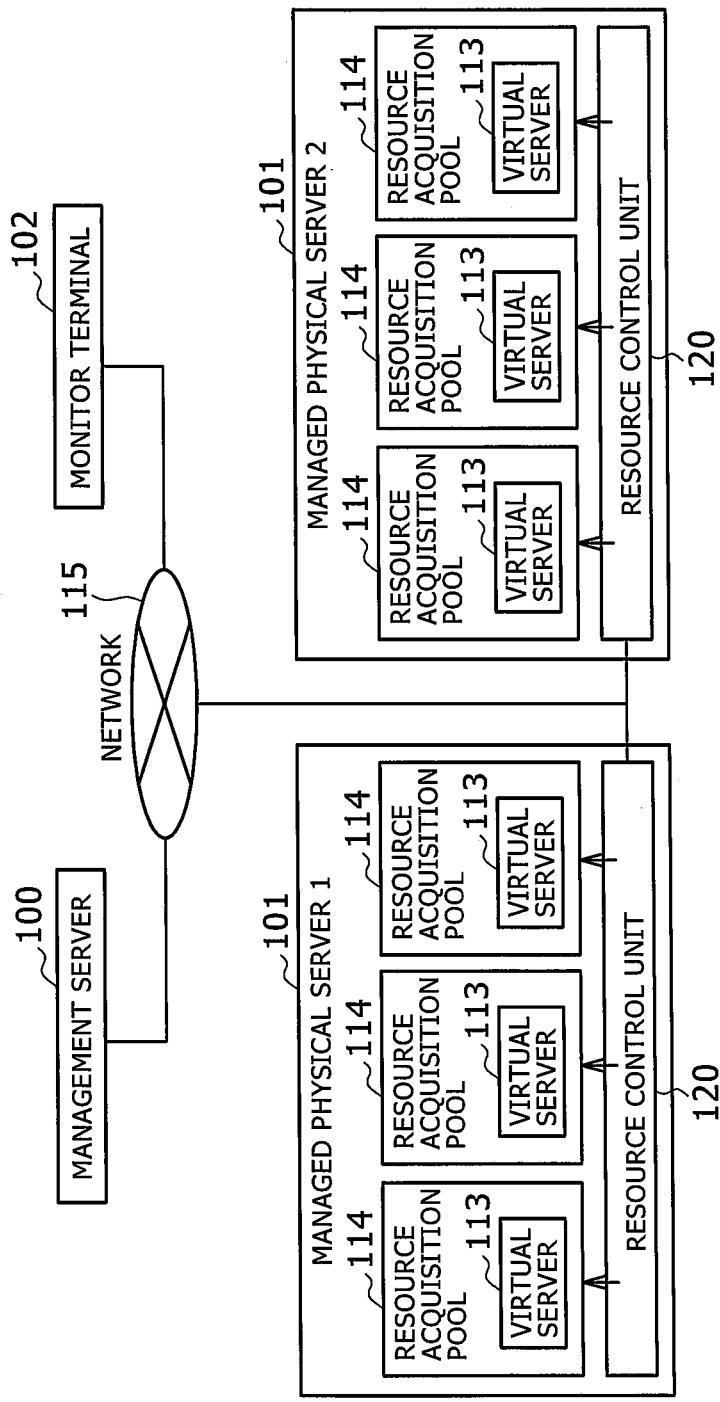
FIG. 18 is a block diagram of the computer system hardware for another embodiment of the present invention.

Another embodiment relating to the configuration of the virtual server 113 and resource acquisition pool 114 for the managed physical server 101 is described next. In the previously described embodiment (FIG. 1) the virtual server 113 is released outside the pool 114 when the management server 100 allocates resources from the resource acquisition pool 114 to the virtual server 113. However, in the embodiment in FIG. 18, a configuration is employed that keeps the virtual server 113 placed within the pool 114.

In this configuration, the virtual server 113 is kept allocated to the resource acquisition pool 114 so that the virtual server 113 occupies the resource acquisition pool 114 resources even if the power to the virtual server 113 is cut off.

Figure 19:
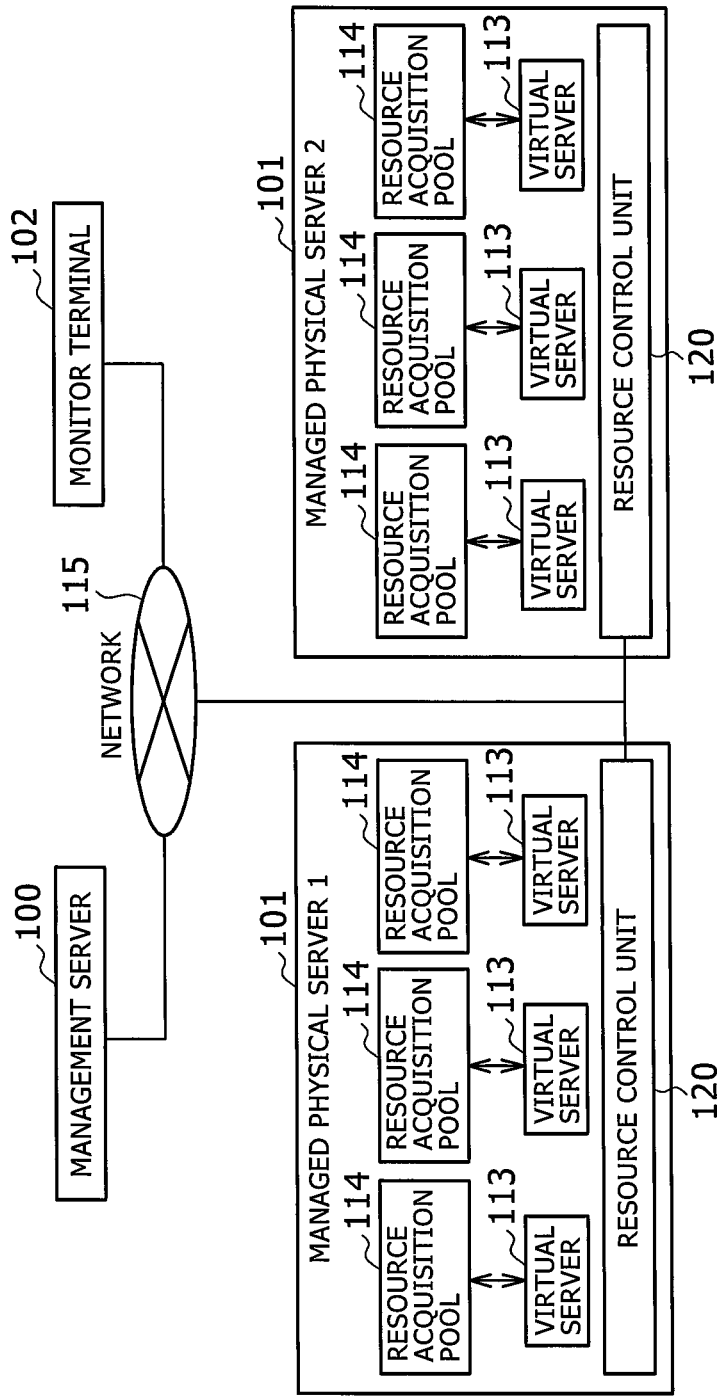
FIG. 19 is a block diagram of the computer system hardware for yet another embodiment of the present invention.

FIG. 19 is a block diagram of the computer system for yet another embodiment for the corresponding relation between the virtual server 113 and the resource acquisition pool 114. In the computer system of the embodiment of FIG. 1, the multiple virtual servers 113 deployed on the physical server 101 share the same resource acquisition pool 114. However in the embodiment of FIG. 19, one (each) virtual server 113 occupies one pool 114 so that no conflicts between other virtual servers occur even if a virtual server 113 is set outside the pool 114.

Figure 20:
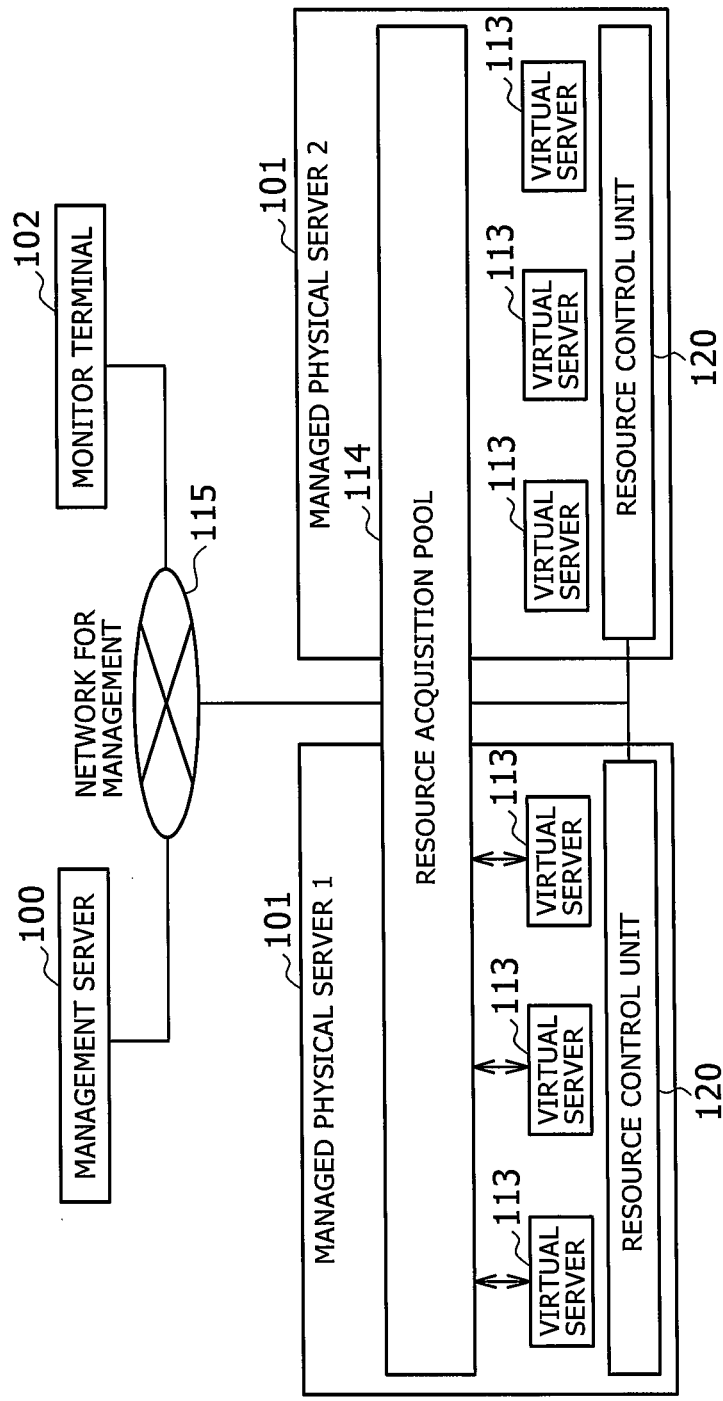
FIG. 20 is a block diagram of the computer system hardware for still another embodiment of the present invention.

FIG. 20 is a block diagram of still another embodiment of the computer system of the present invention. In this embodiment, the resource acquisition pools of the multiple managed servers 101 are clustered together, and resources from the clustered resource acquisition pools 114 are allocated to the virtual server. The resource acquisition pools 114 are set to span across the multiple managed servers 101.

In the embodiment in FIG. 20, resources can be acquired by plural managed servers 101 in single units even in system environments where the virtual server 113 shifts dynamically between plural managed servers 101. This embodiment is effective when acquiring a resource on any managed servers 101 belonging to a group of plural managed servers 101 is needed without specifying a physical server as the deployment destination.

Figure 21:
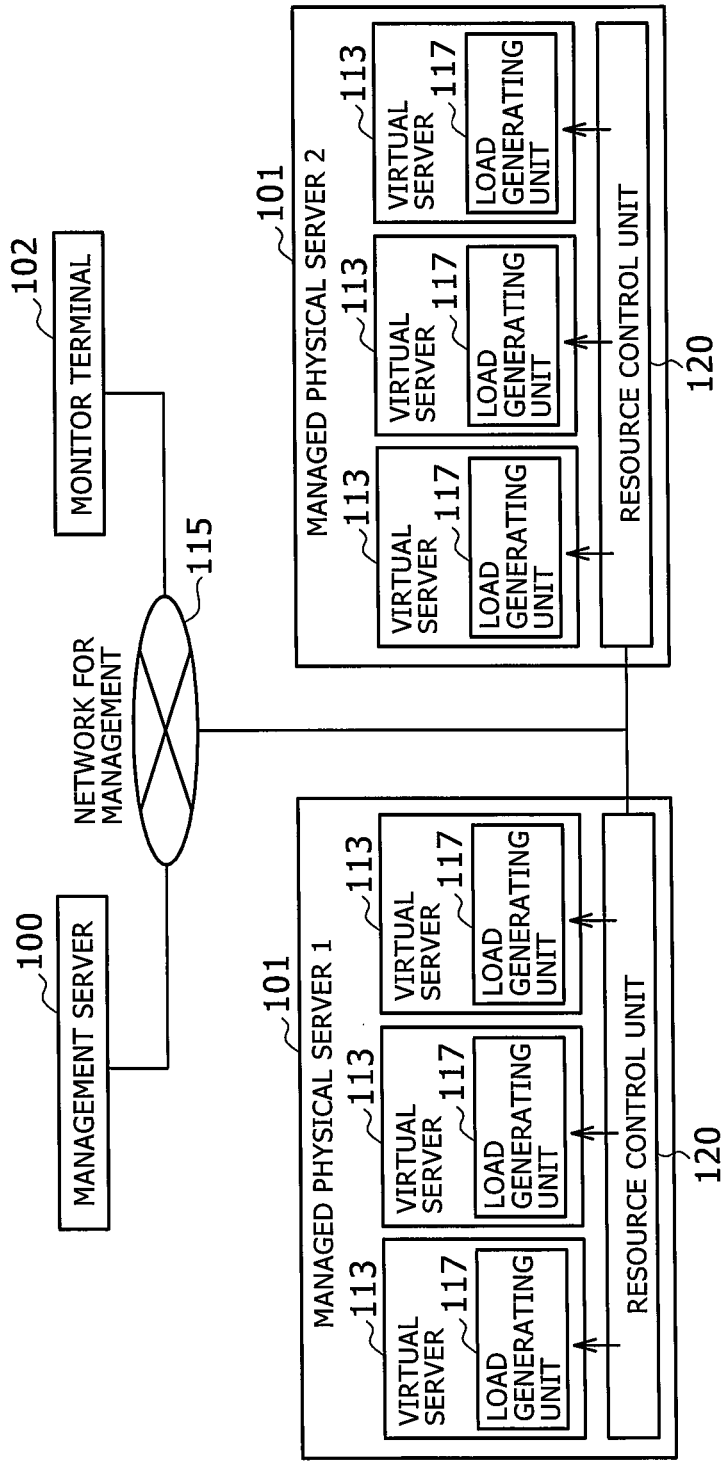
FIG. 21 is a block diagram of the computer system hardware for still yet another embodiment of the present invention.

FIG. 21 is a block diagram of the computer system for still yet another embodiment of the computer system of the present invention. In this embodiment, the managed physical computer 101 includes a function for the virtual server 113 to acquire resources on its own instead of using the resource acquisition pool 114.

The virtual server 113 includes a load generating unit 117 to generate a load on its own. The load generating unit 117 accepts a request from the managed server 100, generates a simulated load, and acquires a resource based on the simulated load. The load generating unit 117 is itself for example a loop program. The CPU in the virtual server 113 continuously or temporarily executes this program to increase the CPU utilization rate. The resource allocation unit 120 decides to increase the load status from the CPU utilization rate in the virtual server and allocates resources to the virtual server.

This embodiment is capable of acquiring resources even in virtual environments not employing the resource pool concept.

Figure 22:
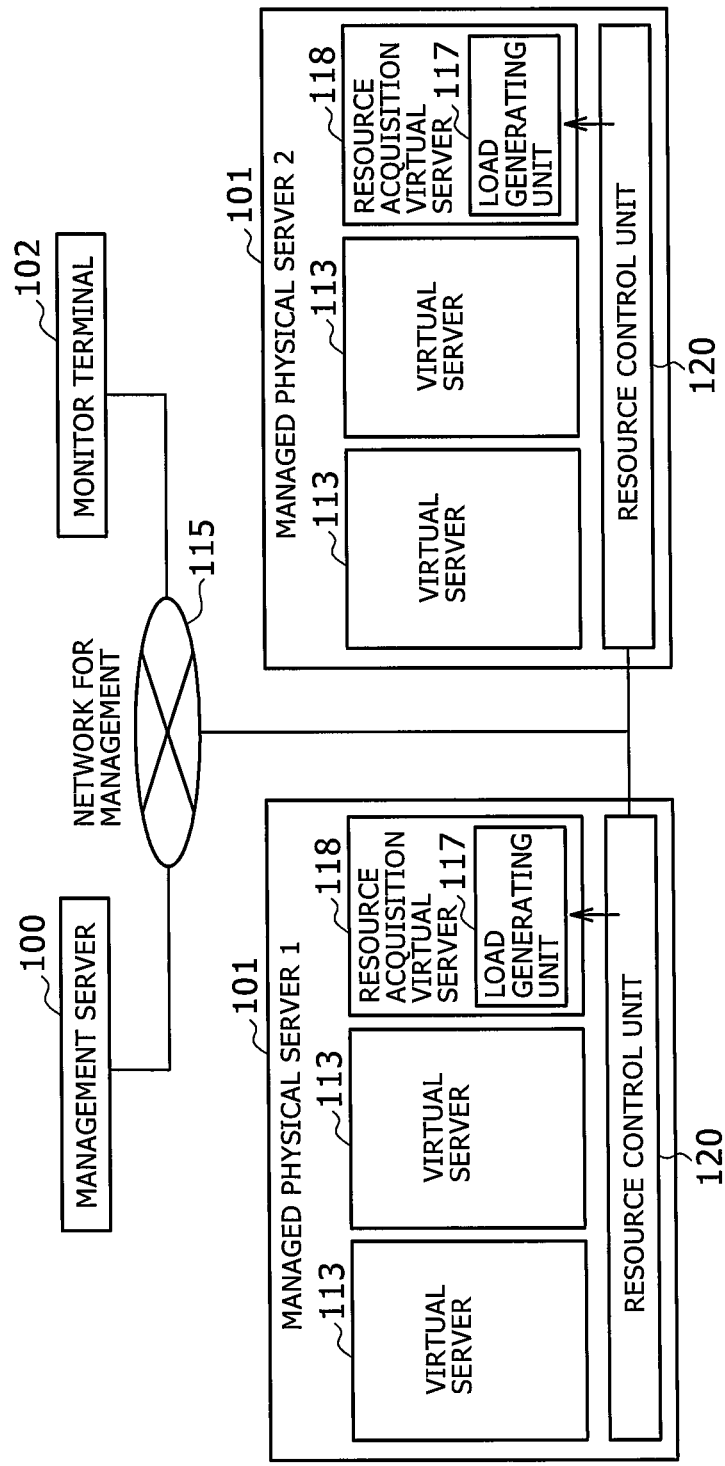
FIG. 22 is a block diagram of the computer system hardware for still another embodiment of the present invention.

FIG. 22 is a block diagram of the computer system for still another embodiment of the computer system of the present invention. The physical server 101 employs a distinctive structure containing a load generating unit 117, a virtual server 118 that is only assigned to other virtual servers and does not itself utilize resources acquired by generating a simulated load, and a virtual server 113 to accept an allocated resource and implement the work-task system. The virtual server 113 for work-tasks and the virtual server 118 for resource acquisition are linked to each other and registered in the linking table 500.

When handing over resources from the virtual server 118 for resource-acquisition to the virtual server 113 for work-task system, the resource acquisition unit 104 synchronizes both servers by increasing or decreasing their loads or in other words the former virtual server gradually releases the acquired resource while gradually lowering the generated load quantity, and the latter virtual server may then acquire resource capacity equivalent to the released resource by gradually raising the guaranteed value.

The resource-acquisition virtual server 118 can be understood using the pool as an example. Utilizing the present embodiment allows acquiring resources even in virtual environments within no concept of a resource pool. The virtual server solely for resource-acquisition is a default and may also be deployed in the physical server.

Figure 23:
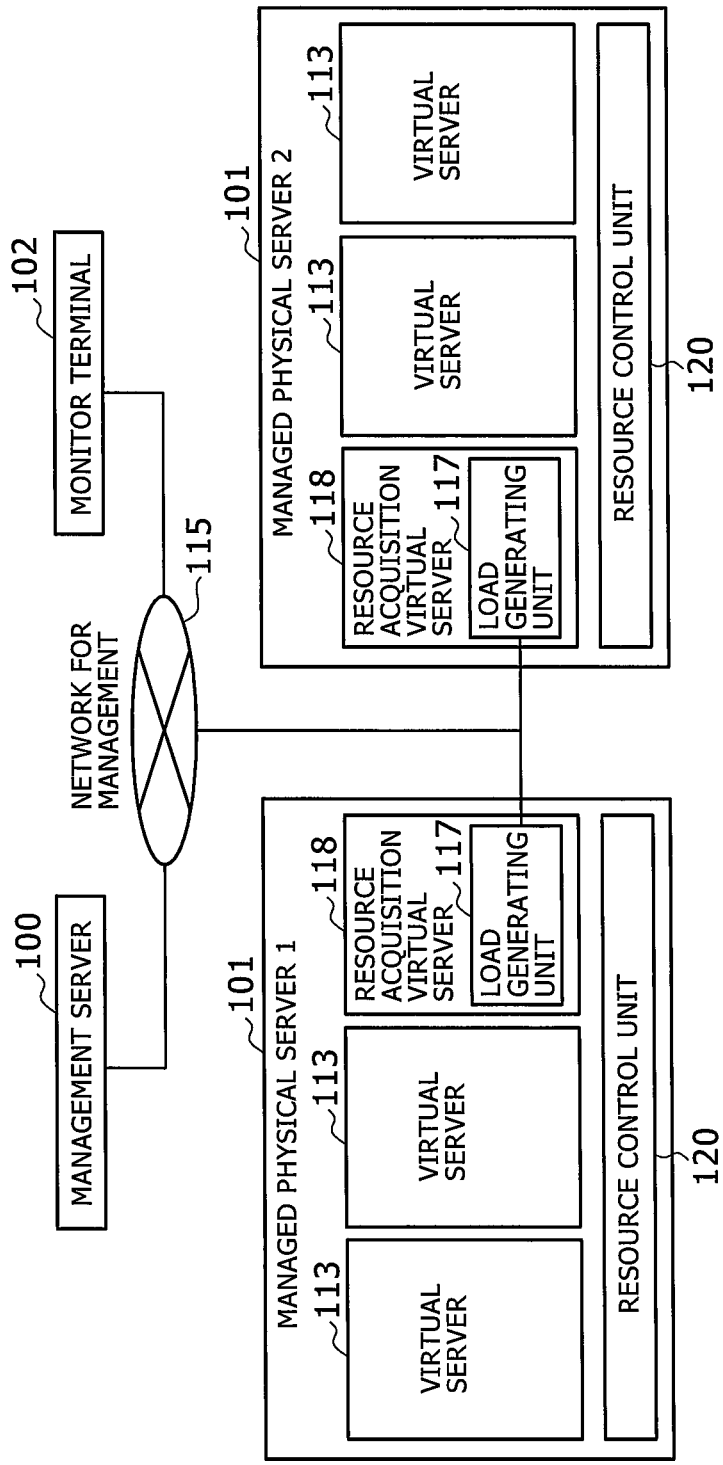
FIG. 23 is a block diagram of the computer system hardware for yet still another embodiment of the present invention.

FIG. 23 is a block diagram of yet another embodiment of the computer system of the present invention. In this structure, the network 115 extending from the management server 100 connects directly to the load generating unit 117 of the resource-acquisition virtual server 118.

The resource-acquisition virtual server 118 must here be clamped in order to prevent dynamic movement to other managed physical servers 101. The virtual server 113 on the other hand need not be clamped relative to the managed physical server 101.

The resource control unit 120 and the management server need not be directly connected by way of the network 115. In the embodiment of FIG. 23, one load generating unit 117 for each managed server 101 is sufficient. Virtual servers 113 not containing a load generating unit 117 are operated on the managed server 101 so conflicts between the load generating unit 117 and work-task systems can be prevented by not operating the load generating unit 117 on a virtual server 113 that runs the work-task system.

The virtual server 113 can be easily removed and restored by not installing any unnecessary programs on the work-task system run by the virtual server 113. Moreover, when authentication information for the resource-acquisition virtual server 118 required for making processing requests to the load generating unit 117 from managed server 100 becomes necessary, however authentication information for the managed physical server 101 is available that quantity is adequate so a small amount of management information is sufficient. The present embodiment can therefore acquire resources even in virtual environments not employing the resource pool concept.

Figure 24:
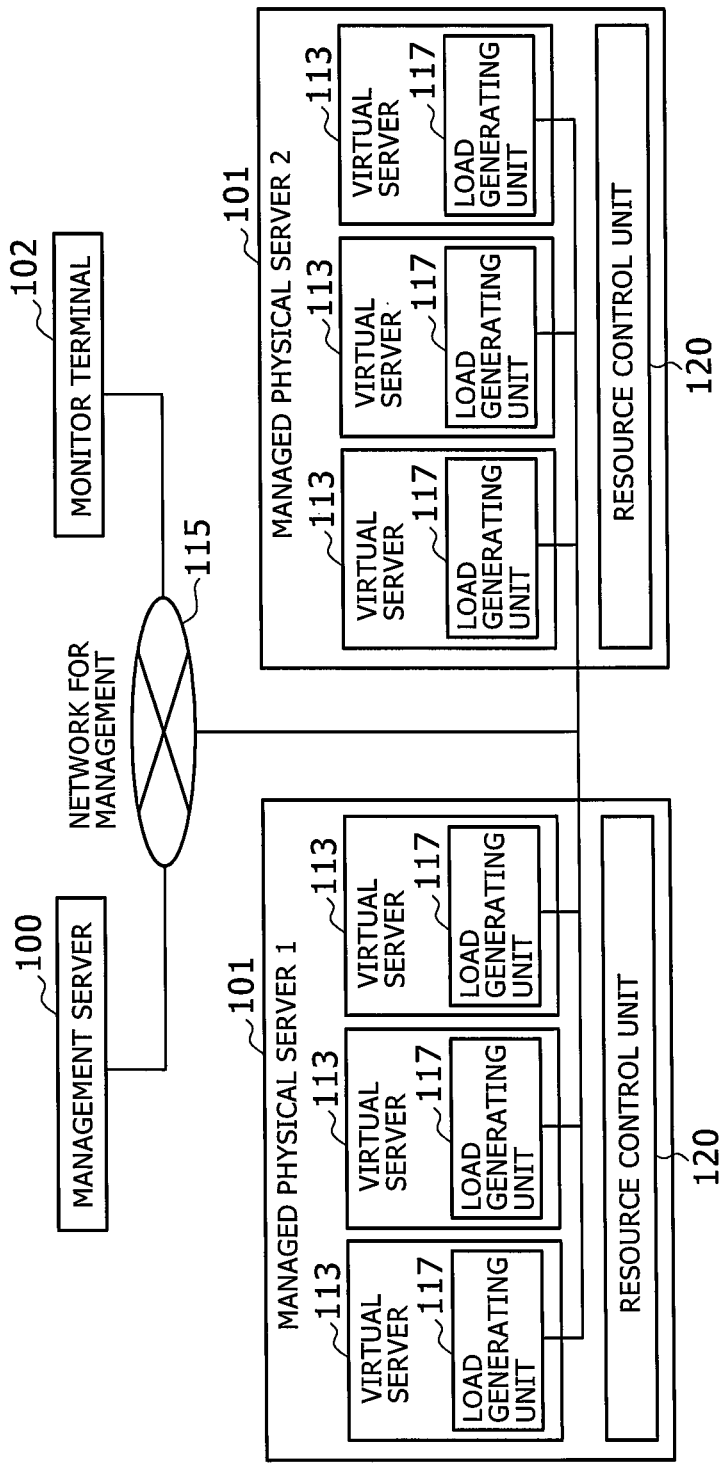
FIG. 24 is a block diagram of the computer system hardware for a further embodiment of the present invention.

FIG. 24 is a block diagram of the computer system for a further embodiment of the computer system of the present invention. In the structure of this embodiment, the management server 100 directly connects to the load generating unit 117 of the virtual server 113 by way of the network 115.

In the embodiment in FIG. 24, there is no need to clamp the relation between the virtual server 113 and the managed server 101. The virtual server 113 may be allowed to dynamically move among the managed servers 101. In such cases resources requested from any of the multiple managed servers 101 can be acquired. If the management server 100 for example is managing the virtual servers 113 by way of the IP addresses set in the virtual servers 113, the resource acquisition process can be continued by continuously applying loads per the load generating unit, even if a virtual server 113 has moved to the second managed server from a first managed server. Resources can in other words be acquired by utilizing the load equalizing program in managed server 101 while dynamically repositioning the virtual server 113.

In the embodiment of FIG. 24, management information can be minimal since the management sever 100 need not manage the relation between the managed server 101 and the virtual server 113. The present embodiment can moreover acquire resources even in virtual environments not employing the resource pool concept.

What is claimed is:

1. A computer system comprising:
    a plurality of physical servers; and
    a management computer to manage the plurality of physical servers,
    wherein the plurality of physical servers each include:
    a first memory to store programs to create and operate virtual machines; and
    a first processor to execute the programs in the first memory to create virtual machines, to allocate resources to the created virtual machines, and to operate the applicable virtual machines, wherein the management computer includes:
a second memory to store programs to manage resources for the virtual machines;
a second processor to execute the programs in the second memory to manage the allocation of resources to the virtual machines, and the second processor is configured to:
identify one of the physical servers which can provide resources to meet a resource capacity required by one of the virtual machines by starting the one of the virtual machines after the installation thereof, and
set the identified one of the physical servers as physical server for running the one of the virtual machines,
wherein the first controller of the one of the physical servers where the one of the virtual machines is installed, operates the one of the virtual machines by allocating the required resource capacity to the installed one of the virtual machines, and
wherein the acquisition of additional resource is requested after a fixed period of time has elapsed.

2. A computer system according to claim 1,
wherein the second controller is further configured to:
install the one of the virtual machines in the identified one of the physical servers capable of acquiring the required resource capacity all at one time, and
if none of the physical servers are capable of acquiring the required resource capacity all at one time, install the one of the virtual machines in the identified one of the physical servers which is capable of attaining the required resource capacity acquisition while continuously acquiring a resource capacity smaller than the required resource capacity by the starting of the one of the virtual machines.

3. A computer system according to claim 1,
wherein each of the physical servers includes a pool of resources able to be allocated to the virtual machine, and
wherein the first controller is configured to:
allocate the required resource capacity to the virtual machines from the applicable pool by starting the virtual machines.

4. A computer system according to claim 3,
Wherein the second controller is further configured to:
set a parameter equivalent to the required resource capacity for the pool,
decide whether or not the pool can acquire the required resource capacity based on the parameter, and
install the one of the virtual machines in the identified one of the physical servers containing the pool capable of acquiring the required resource capacity based on the decision results.

5. A computer system according to claim 4,
wherein the second controller is further configured to:
compare a threshold value and the parameter,
acquire the required resource capacity all at one time in at least one of the pools in the physical servers when decided that the parameter is smaller than the threshold value,
continuously acquire resources to meet the required resource capacity in at least one of the pools in the physical servers when the parameter is larger than the threshold value, and
install the one of the virtual machines in the identified one of the servers containing the pool where the required resource capacity was acquired.

6. A computer system according to claim 3,
wherein the second controller is further configured to:
distribute the resource from the pool to the virtual machines according to a level of priority in a work-task system operated by each of the virtual machines, when allocating resources to the virtual machines from the pool.

7. A computer system according to claim 3,
wherein the second controller is further configured to:
distribute the resources from the pool to the virtual machines according to a system configuration of a work-task system operated by each of the virtual machines, when allocating the resources to the virtual machines from the pool.

8. A computer system according to claim 3,
wherein the second controller is further configured to:
when setting the one of the virtual machines in the identified one of the physical servers, install the one of the virtual machines in the identified one of the physical servers containing a pool that acquired the required resource capacity, and
release the resources acquired in the applicable pool when the when no virtual machines are installed in the identified one of the physical servers.

9. A computer system according to claim 3,
wherein the second controller is further configured to:
predict increasing trend in the resource capacity of the pool,
decide whether or not the required resource capacity can be acquired in the pool by the starting of the virtual machine operation based on the prediction results, and
output a decision result to an administrator.

10. A computer system according to claim 1,
wherein each of the first controllers for the physical servers is configured to:
generate a load,
operate a resource-acquisition virtual machine to acquire resources by utilizing the applicable load, and
allocate the acquired resources from the resource-acquisition virtual machine to the virtual machines deployed by the second controller so that the virtual machines execute a work-task system by utilizing the allocated resources.

11. A control method for a computer system including a plurality of physical servers to operate virtual machines and a management computer to manage the allocation of resources by the physical servers to the virtual machines, the method comprising:
the management computer deciding whether or not any of the physical servers can provide a guaranteed resource capacity for one of the virtual machines at one time,
if the decision was negative, the management computer identifying one of the physical servers which can provide resources to meet a resource capacity required by one of the virtual machines, the resources provided by the one of the physical servers are a summation of resources which are able to be allocated to the one of the physical servers and are scheduled with each time when a resource capable of being allocated to the one of the physical servers occurs by starting the one of the virtual machines after the installation thereof; and
setting the identified one of the physical servers as a physical server for running the one of the virtual machines,
wherein the acquisition of additional resource is requested after a fixed period of time has elapsed.

12. A management computer for a plurality of physical servers, to generate virtual machines, allocate resources to the generated virtual machines, and operate the applicable virtual machines, comprising:
- a controller including a memory which stores a program, and a processor to execute the program, and, by executing the program, the controller is configured to:
- manage the allocation of resources to the virtual machines;
- identify one of the physical servers which can provide resources to meet a resource capacity required by one of the virtual machines, the resources provided by the one of the physical servers are a summation of resources which are able to be allocated to the one of the physical servers and are scheduled with each time when a resource capable of being allocated to the one of the physical servers occurs by starting the one of the virtual machines after the installation thereof; and
- allocates the required resource capacity to the one of the virtual machines installed in the identified one of the physical servers in order to operate the one of the virtual machines,
- wherein the acquisition of additional resource is requested after a fixed period of time has elapsed.

13. A management computer according to claim 12, wherein the controller is further configured to:
- if one of the physical servers is capable of acquiring the required resource capacity all at one time, install the one of the virtual machines in the one of the physical servers, and
- if none of the physical servers are capable of acquiring the required resource capacity all at one time, install the one of the virtual machines in the identified one of the physical servers which is capable of attaining the required resource capacity while continuously acquiring a resource capacity smaller than the required resource capacity by the starting of the one of the virtual machines.

14. A physical server comprising:
- a virtual machine;
- a pool to acquire a resource; and
- a controller comprising a memory which includes programs and a processor which executes the program,
- wherein the controller, by executing the program, is configured to:
- allocate the acquired resource from the pool;
- operate a work-task system based on the resource allocated to the virtual machine;
- provide resources to meet the resource capacity required by the virtual machine, the resources provided by the pool are a summation of resources which are able to be allocated and are scheduled with each time when a resource capable of being allocated occurs by starting the virtual machine after installing the virtual machine; and
- run the virtual machine,
- wherein the acquisition of additional resource is requested after a fixed period of time has elapsed.

15. A physical server according to claim 14, wherein the controller is further configured to:
- acquire acquires the required resource capacity all at one time in the pool when the required resource capacity is smaller than a threshold value, and
- acquire acquires the required resource capacity continuously in the pool when the required resource capacity is larger than the threshold value.

* * * * *